United States Patent
Murphy et al.

(10) Patent No.: US 9,961,030 B2
(45) Date of Patent: May 1, 2018

(54) METHOD AND SYSTEM FOR SENDER-CONTROLLED MESSAGING AND CONTENT SHARING

(71) Applicant: Private Giant, Orlando, FL (US)

(72) Inventors: Shaun Murphy, Orlando, FL (US); Charles Murphy, Sarasota, FL (US); Richard Johnson, Briarcliff Manor, NY (US)

(73) Assignee: PRIVATE GIANT, Orlando, FL (US)

( * ) Notice: Subject to any disclaimer, the term of this patent is extended or adjusted under 35 U.S.C. 154(b) by 0 days. days.

(21) Appl. No.: 14/874,346

(22) Filed: Oct. 2, 2015

(65) Prior Publication Data

US 2016/0380937 A1 Dec. 29, 2016

Related U.S. Application Data

(60) Provisional application No. 62/183,855, filed on Jun. 24, 2015.

(51) Int. Cl.

| | |
|---|---|
| *G06F 15/16* | (2006.01) |
| *H04L 12/58* | (2006.01) |
| *H04L 9/08* | (2006.01) |
| *H04L 9/30* | (2006.01) |
| *H04L 12/741* | (2013.01) |

(52) U.S. Cl.
CPC ................. *H04L 51/12* (2013.01); *H04L 9/08* (2013.01); *H04L 9/30* (2013.01); *H04L 45/745* (2013.01); *H04L 51/08* (2013.01); *H04L 51/14* (2013.01); *H04L 51/18* (2013.01)

(58) Field of Classification Search
CPC .. H04L 63/08; H04L 63/0245; H04L 63/0428
USPC ........................................ 709/204, 206, 207
See application file for complete search history.

(56) References Cited

U.S. PATENT DOCUMENTS

| | | | |
|---|---|---|---|
| 6,314,409 B2 * | 11/2001 | Schneck ................. | G06F 21/10 380/259 |
| 6,510,468 B1 * | 1/2003 | Hayne ............... | G06F 17/30893 707/E17.117 |
| 6,519,367 B2 * | 2/2003 | Nagarajan .......... | H04N 1/40075 382/252 |
| 6,836,846 B1 * | 12/2004 | Kanevsky ............... | H04L 51/18 707/999.009 |
| 7,237,008 B1 * | 6/2007 | Tarbotton ............. | G06Q 10/107 709/206 |
| 7,412,481 B2 * | 8/2008 | Nicholls .......... | G06Q 10/06311 709/204 |

(Continued)

*Primary Examiner* — Kristie Shingles
(74) *Attorney, Agent, or Firm* — Shun Yao; Park, Vaughan, Fleming & Dowler LLP

(57) ABSTRACT

A messaging and content sharing platform that allows for sender-controlled permissions and rules. During operation, a sending device can receive user input to set permissions and rules for an object to be sent to a receiving device. The permissions and rules control how the object will be managed after leaving the sending device. A receiving device receives the object and complies with the permissions and rules associated with the object. Other features of the platform include a hierarchical view for group messaging, an attachment-only view of messages, large file attachments, and the ability to allow users to access external services such as social networking websites without logging in.

30 Claims, 15 Drawing Sheets

SETTING RULES FOR A NEW MESSAGE

(56) References Cited

U.S. PATENT DOCUMENTS

| | | | | |
|---|---|---|---|---|
| 7,430,754 B2* | 9/2008 | Speare | ............... | G06Q 10/107 |
| | | | | 726/1 |
| 7,502,760 B1* | 3/2009 | Gupta | ............... | G06Q 20/367 |
| | | | | 705/64 |
| 8,130,952 B2* | 3/2012 | Shamoon | ........... | H04L 63/0428 |
| | | | | 360/60 |
| 8,843,567 B2* | 9/2014 | Karnik | ............... | G06Q 10/107 |
| | | | | 709/206 |
| 8,978,091 B2* | 3/2015 | Banti | ............... | H04L 63/0263 |
| | | | | 726/1 |
| 9,251,539 B2* | 2/2016 | Imrey | ............... | G06Q 20/027 |
| 9,253,154 B2* | 2/2016 | Gaitonde | ............ | H04L 63/0236 |
| 9,418,244 B2* | 8/2016 | Banti | ............... | H04L 63/0263 |
| 2005/0198173 A1* | 9/2005 | Evans | ................... | H04L 51/12 |
| | | | | 709/206 |
| 2005/0216901 A1* | 9/2005 | Speare | ............... | G06F 21/606 |
| | | | | 717/168 |
| 2006/0031311 A1* | 2/2006 | Whitney | ............... | H04L 51/12 |
| | | | | 709/206 |
| 2007/0190978 A1* | 8/2007 | White | ................... | H04L 12/583 |
| | | | | 455/412.1 |
| 2008/0289037 A1* | 11/2008 | Marman | ............... | H04L 12/585 |
| | | | | 726/22 |
| 2008/0297305 A1* | 12/2008 | Little | ...................... | H04L 67/02 |
| | | | | 340/5.1 |
| 2009/0031216 A1* | 1/2009 | Dressel | ............... | G06Q 30/02 |
| | | | | 715/255 |
| 2011/0029615 A1 | 2/2011 | Shaffer et al. | | |
| 2011/0055334 A1* | 3/2011 | Tivyan | ............... | H04L 12/5875 |
| | | | | 709/206 |
| 2015/0149774 A1 | 5/2015 | Taima | | |

\* cited by examiner

SENDING MESSAGE/CONTENT

FIG. 4  ACCESSING EXTERNAL SERVICES

FIG. 5 SETTING RULES FOR A NEW MESSAGE

FIG. 6 CHANGING PERMISSIONS ON ALL RECIPIENTS OF A NEW MESSAGE

FIG. 7  GROUP MESSAGING HIERARCHICAL DISPLAY

METHOD AND SYSTEM FOR SENDER-CONTROLLED MESSAGING AND CONTENT SHARING

RELATED APPLICATION

This application claims the benefit of U.S. Provisional Application No. 62/183,855, entitled "METHOD AND SYSTEM FOR CONTROLLING ACCESS TO ENCRYPTED DATA," by inventors Shaun Murphy, Charles Murphy, and Richard Johnson, filed 24 Jun. 2015.

The subject matter of this application is related to the subject matter in a non-provisional application by the same inventors as the instant application and filed on 4 Jun. 2012 entitled "CONFIDENTIAL MESSAGE EXCHANGE USING BENIGN, CONTEXT-AWARE COVER MESSAGE GENERATION," having application Ser. No. 13/488,391, and issued on 15 Jul. 2014 as U.S. Pat. No. 8,782,409, the disclosure of which is incorporated by reference herein.

The subject matter of this application is related to the subject matter in a non-provisional application by the same inventors as the instant application and filed on 30 May 2013 entitled "METHOD AND SYSTEM FOR AUTOMATIC GENERATION OF CONTEXT-AWARE COVER MESSAGE," having application Ser. No. 13/906,039, and issued on 23 Dec. 2014 as U.S. Pat. No. 8,918,896, the disclosure of which is incorporated by reference herein.

BACKGROUND

Field

This disclosure is generally related to messaging and content sharing, and facilitating secure communication between two devices. More specifically, this disclosure is related to a messaging and content sharing platform with sender-controlled security and other features. This disclosure is also related to an access-control device that controls access to encrypted data.

Related Art

As an increasing number of users come online, they discover the joys and pitfalls of communicating over the Internet. Users find that they like to share content and communicate with each other over Internet. However, as many users have realized too late, once their e-mail has been sent out they no longer have control how their e-mail is being used. Their e-mails and other communications can be forwarded to others and quickly spread beyond their intended audience. This can have a detrimental or even devastating effect on the original sender, who did not intend the reading audience to expand beyond the original recipient. Therefore, a better way for users to control their communications is needed.

SUMMARY

One embodiment provides a system for sending an object. During operation, a sending device receives the object, wherein the object is a message or other content. The sending device may receive user input to set permissions and/or rules for the object. A respective permission indicates a respective operation that a receiving device may perform on the object, and a respective rule indicates an operation that the receiving device performs when a specified condition occurs in connection with the object. The sending device may attach the permissions and rules to the object. The sending device then sends a portion of the object to the receiving device.

In some embodiments, the sending device may generate a unique identifier for a portion of the object. The sending device may then send the portion of the object with the unique identifier to a server. The unique identifier is optionally stored via a distributed lookup table including but not limited to a distributed hash table. The sending device may then send the unique identifier to the receiving device.

In some embodiments, in a messaging session involving a plurality of users, the sending device may display responses to each user according to a hierarchical structure so that a response to a message in a message thread is depicted as branching off from the message.

In some embodiments, a rule is one of: disallowing the receiving device from forwarding the message; disallowing the receiving device from taking a screenshot of the object; disallowing the receiving device from printing the object; disallowing the receiving device from downloading the object; requiring that the receiving device delete an object after taking a screenshot; and requiring that the receiving device delete an object after the user views the object.

In some embodiments, the sending device allows the user to anonymously send a message and/or other content to an external service. The sending device may verify the identity of the user, and allow the user to receive messages from others and continue messaging with others using the user's verified identity.

In some embodiments, the sending device displays a plurality of messages in attachment view so that the user may view only the attachments, in which an attachment includes a generated thumbnail for each file that is smaller than the original size of the file.

In some embodiments, a permission indicates whether the receiving device is allowed to perform one of the following: forward the message and/or content; stash the message and/or content; add a participant to a message header indicating parties that receive the message and associated replies; remove a participant from the message header indicating parties that receive the message and associated replies; take a screenshot that includes the message and/or content; select text from the message and/or content; print the message and/or content; and download the message and/or content to external storage.

In some embodiments, the object is encrypted with a symmetric key and the symmetric key is encrypted with a public key of the receiving device. Furthermore, sending the portion of the object further includes encrypting the object and sending a portion of the encrypted object to the receiving device.

In some embodiments, the sending device may receive user input to specify permissions for others to access and roll back an item in a stash.

In some embodiments, the sending device may perform optical character recognition on attachments. The sending device may then receive user input specifying a search item, and search through the attachments and associated metadata for the search item.

Another embodiment provides a system for receiving an object. During operation, a receiving device receives the object, wherein the object is a message or other content. The receiving device may extract permissions and/or rules from the object. A respective permission indicates a respective operation that the receiving device may perform on the object, and a respective rule indicates an operation that the receiving device performs when a specified condition occurs in connection with the object. The receiving device may then provide the object to a user.

In some embodiments, the object is encrypted, and decrypting the object involves obtaining an encrypted portion of the object from a server.

In some embodiments, the receiving device receives user input specifying an operation to be performed on the object. The receiving device may then determine whether the operation is authorized based on the rules and/or permissions of the object. Responsive to determining that the operation is authorized, the receiving device may perform the operation on the object.

In some embodiments, the object is encrypted and extracting permissions further includes: the receiving device decrypts and extracts a symmetric key from the message using a private key of the receiving device. The receiving device then decrypts the object with the symmetric key.

Another embodiment of the present invention provides a personal computing device that can push data objects to one or more intended recipients. During operation, the computing device can obtain a data object being published by a user. The computing device can generate a partial message that includes a subset of the data object, and can send the partial message to an intended recipient of the data object, without first receiving a request for the data object from the intended recipient.

Another embodiment of the present invention includes an access-control device that can control access to encrypted messages. During operation, the access-control device can receive an access key for a data object being shared with at least one intended recipient, and a digest associated with the data object, and may store the access key and the digest in a look-up repository. In response to the device receiving a request for the data object from a remote device, the device may obtain a second digest from the request. Moreover, the device may analyze the second digest to determine whether the second digest is valid. In response to validating the second digest, the device may return the access key to the remote device.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of providing sender-controlled messaging and content sharing security by allowing a user to set rules and permissions to control the use and lifecycle of messages and/or other content. A messaging and content sharing platform and system includes a client installed on each mobile device that allows a sender to set permissions and rules for a message or content. These permissions and rules give the sender complete control over how a receiving party may use the message and/or content. For example, a sender may disallow the receiving party from forwarding, taking a screenshot, printing, or downloading the message. The sender may also require that the receiving device delete the message after taking a screenshot or after the user views the message. Note that embodiments of the present invention are not limited to the disclosed examples.

The messaging and content sharing platform may also feature a hierarchical display for group messaging that utilizes a tree structure to illustrate the threads of a conversation when multiple users are communicating with each other. This allows the user to easily follow the group conversation and see who is messaging whom in the conversation.

The messaging and content sharing platform may also include an attachment-only view so that a user can scroll through the list of file attachments and filter attachments to find what they need. The attachment-only view may apply system-wide (e.g., in the inbox, contact view, and message view). The attachment-only view may be available anywhere a file may be associated with a system object or action. The system may allow for large file attachments (e.g., one terabyte or greater). Management of large file attachments is transparent to the user and users do not need to separately upload large files to another server themselves.

Some embodiments may also include a zero-login feature that allows a user to use an external service, such as a social networking service, without logging in. The user can use the social networking service anonymously to contact others until the user wants to authenticate his identity with the external service.

Exemplary Network Environment

Figure 1:
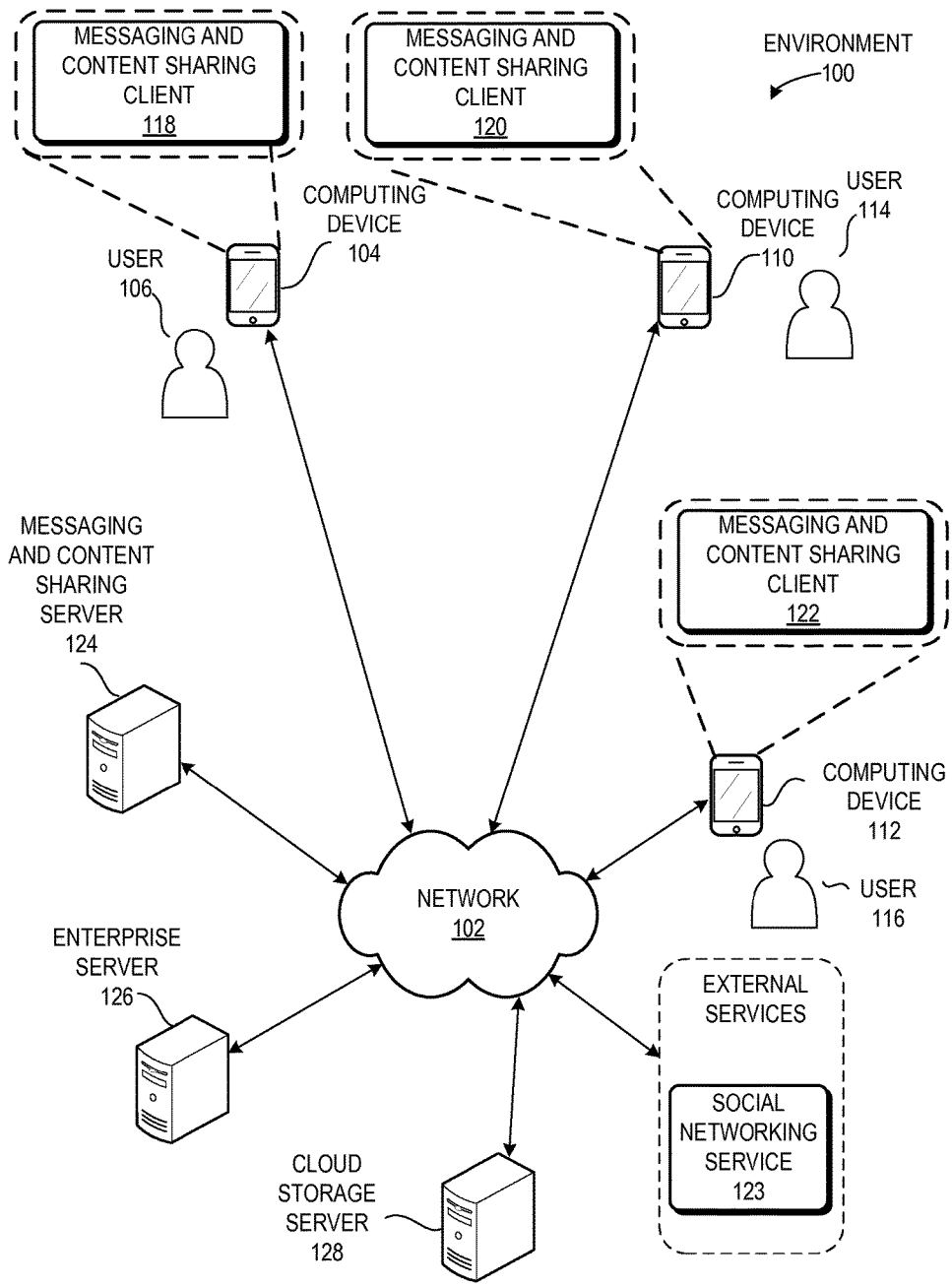
FIG. 1 illustrates an exemplary network environment that facilitates a messaging and content sharing platform with sender-controlled security in accordance with an embodiment.

FIG. 1 illustrates an exemplary network environment 100 that facilitates a messaging and content sharing platform with sender-controlled security in accordance with an embodiment. Network environment 100 can include a computer network 102, which can include any wired or wireless network that interfaces various computing devices to each other, such as a computer network implemented via one or more technologies (e.g., Bluetooth, Wi-Fi, cellular, Ethernet, fiber-optic, etc.). In some embodiments, network 102 includes the Internet.

Network environment 100 can also include a computing device 104, which a user 106 uses to communicate a message or content to another computing device, such as computing device 110 or computing device 112. User 114 operates computing device 110 and user 116 operates computing device 112. User 106 may use a messaging and content sharing client 118 installed on computing device 104 to send messages or other content to the other users. The message or content can be text, voice, and/or video. Client software 118 allows a user to send messages, message attachments, files, and other content. Computing device 110 and computing device 112 also have installed messaging and content sharing clients 120, 122 respectively. User 106 may also anonymously access external services, such as social networking service 123. Although FIG. 1 depicts computing device 104 as a smartphone, computing device 104 can be also be a personal computer or any device that user 106 can use to send messages or share file/content with user 112.

A messaging and content sharing server 124 can store and execute server software, and may store content such as files or attachments from messages that a user shares with others. The system may split up a file so that malicious attackers have greater difficulty finding and reassembling the separate parts of the encrypted file. Server 124 can store small portions of encrypted files and/or large portions of the encrypted files. The system may also send a large portion of an encrypted file to an enterprise hardware device, such as an enterprise server 126, for storage. Further, the system may store a large portion of the encrypted file using cloud storage services, such as cloud storage server 128. Note that generally the system can split apart objects (encrypted or not), and store a portion of the object in one location and the remainder of the object in any number of other locations, the details of which are further disclosed in U.S. Provisional Application No. 62/183,855. Objects may include, but are not limited to, pictures, videos, documents, text messages, emails, and other digital items.

Permissions and Rules

A user may control the use of messages or other content using permissions and rules. A permission associated with an object, such as a message and/or content, indicates an operation that a receiving device may perform on the object. The user may set one or more permissions to control the operations that the recipients can perform with the messages/content. For example, the user may set permissions to allow or prevent forwarding a message, locally download an attachment, and add/remove a participant in a group message. The user may also set permissions to allow or prevent taking a screenshot, printing, and/or archiving a message or content. The user can set default permissions that apply globally or per contact. The user can also set fine-grained permissions, such as permissions that apply per user and/or per attachment. Furthermore, the user may change the permissions at any time.

A rule associated with an object, such as a message and/or content, indicates an operation that the receiving device performs when a specified condition or event occurs. For example, a rule may specify that a receiving device delete a message and/or content after it has been read. Another rule may specify that a receiving device delete a message and/or content after a certain time period. Another example of a rule is that a receiving device is required to delete all messages and/or content sent to a user if the user tries to take a screenshot of the message and/or content. As another example, the user may set a rule to control the length of time that the message and/or content is available to recipients. The user may set default rules that apply globally or per new message and/or content sent, and the user may change the rules at any time.

Note that all objects in the system are associated with permissions and rules, and embodiments of the present invention are not limited to the example permissions and rules. When a device obtains or generates an object, the device can determine the permissions and rules associated with the object and perform operations on the object or manage the object in accordance with the object's permissions and rules. For example, message objects, stored content objects, and file attachment objects are all associated with permissions and rules and a device that obtains or generates an object will comply with the permissions and rules associated with the object. Moreover, the entire messaging and content sharing system complies with permissions and rules set for objects, and embodiments of the present invention are not limited to the example objects.

Besides permissions and rules, the user can also delete a message across all devices. The user can send a message and then pull back the message. If the recipient forwards a message the user can choose to delete across all devices, including any forwarded messages, to pull back the forwarded message. By pulling back the message from a receiving device, the receiving device no longer has access to the message. Furthermore, when a user forwards a message, the system can guarantee that the user has not modified the forwarded information in any way. The system may secure a message so that the user may not tamper with the message when forwarding the message to another user. A user can not manipulate or otherwise tamper with a message and then forward it to another user without others (e.g., the user receiving the forwarded message and/or the sending user) knowing of the changes.

Sending Large Files

The system may also allow for sending large file attachments, such as terabyte-size attachments, by combining cloud storage with messaging. Current messaging systems are generally designed for storing and sending text messages, not binary files/objects or very large files/objects. A user may send a large file through the messaging system without the user needing to upload the large file to a storage service that can handle large files. The system may divide a large encrypted file into a small portion that the system may send with the message and a large portion that the system sends to a remote server for storage and access by others.

The system may generate a link or reference to the large file or a significant portion of the large file and include the link with the message. The system may also generate a universal unique identifier for the large file. Generally, the system may assign a universal unique identifier to each object. The universal unique identifier is not tied to any specific user. This facilitates storing links to content via a distributed hash table so that the content is not stored on a central storage point.

The system may send the universal unique identifier and the link to the receiving device, and, in some embodiments, may also include a small portion of the large file with the message. The system may send the large file to a server with the universal unique identifier.

The server may store data associating the file attachment with the unique identifier. The system may include a distributed hash table implemented across multiple servers to store the associations between the unique identifier and stored data (e.g., the file attachment). A server may send the file attachment to any device that queries for data using the unique identifier. For example, when a device receives a message, the device obtains the unique identifier to retrieve the large file attachment. The user on the receiving device does not need to know that the large file attachment was retrieved from a remote server (e.g., a file storage service).

In some embodiments, the system may also provide an attachment-only view. When the user selects this view, the system hides the conversation portion and only displays attachments. The system may display multiple pictures of varying sizes that indicates to the user the contents of the attachments. The system may perform optical character recognition on the attachments to allow the user to search through the attachments. The user can scroll through a list of attachments to find what the user is searching for. The user can filter or sort the attachments in different ways, such as by date, filename, and/or sender name. The user may search through metadata in attachments and also use Boolean logic to combine different sorting and filtering conditions. For example, the user may specify to sort according to name and date. Further, each file/attachment may have a client-generated thumbnail for each file that is very small in size and quick to transfer. This thumbnail may be generated by a sending device. This provides the recipient a way to see a lower resolution preview of each picture, video (e.g., animated preview), Word document, etc. without having to download the original document. The attachment view features may also include the ability or intelligence to search for content inside and around the files (e.g., optical character recognition, meta data search, etc.) for advanced search and sorting. Note that current e-mail software requires the user to go through old e-mail messages to find attachments and this can be very inconvenient and slow for a user since the user must click each attachment to see the contents.

Note that the messaging and computing system described herein may be implemented under a software as a service licensing and delivery model, and customers may license the software for the messaging and computing system on a subscription basis.

Sending Message and/or Content

Figure 2:
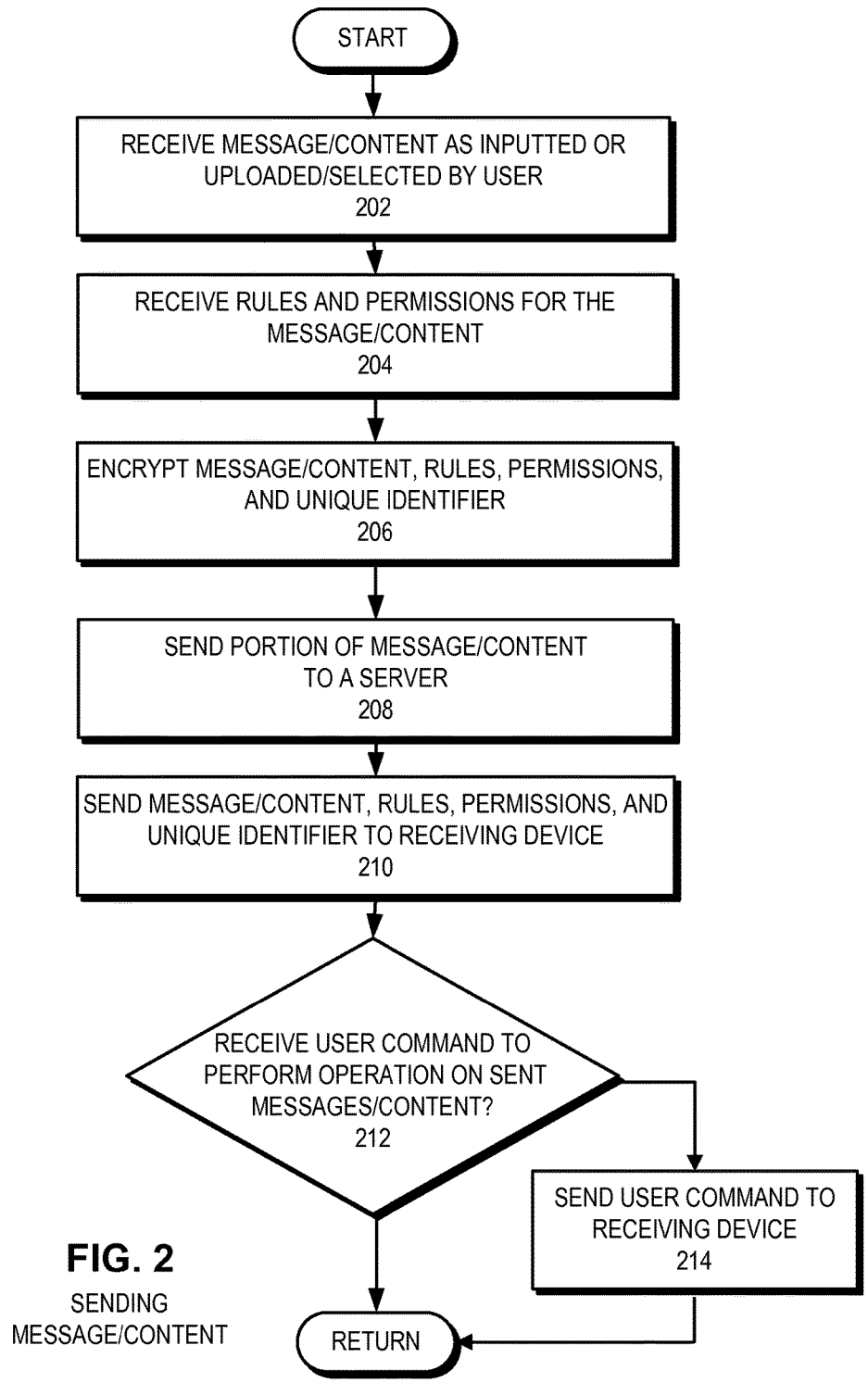
FIG. 2 presents a flowchart illustrating a method for sending a message and/or content to a recipient in accordance with an embodiment.

FIG. 2 presents a flowchart illustrating a method for sending a message and/or content to a recipient in accordance with an embodiment. Note that different embodiments may vary according to detail and order of operations, and embodiments are not limited to the specific operations depicted in the figure. During operation, the sending device can initially receive a message as inputted by the user. The system may also receive content uploaded by the user or selected by the user (operation 202). The system can also receive rules and permissions from the user for the message and/or content (operation 204). The system can also use default rules and permissions for the message and/or content.

The sending device can then encrypt the message and/or content, which may include rules, permissions, a security object that includes permission and rule data, a unique identifier, and/or any other data (operation 206). The sending device can encrypt data using a symmetric key, and then encrypt the symmetric key separately for each intended recipient using a recipient-specific public key. The sending device system sends the encrypted symmetric keys to multiple devices. The recipients of the encrypted symmetric keys can use their own private key to decrypt and extract the symmetric key, and use the symmetric key to decrypt data sent from the sending device.

Generally, the system may encrypt all objects using a per-object symmetric encryption key, and the system encrypts the key for a symmetric key-encrypted object using asymmetric encryption. That is, the sending device need only encrypt an object once using a symmetric key and then encrypt the symmetric key specifically for each recipient. The sending device need not encrypt an object multiple times for different recipients. This saves time and is more efficient because some of the objects may be large file attachments or content (e.g., 1 terabyte or larger).

The system may use a different symmetric key for encrypting each object and does not reuse a symmetric key to encrypt a different object. For example, the system uses a different symmetric key for encrypting each of the message, the message attachment, a thumbnail attachment, and all other objects associated with the message. Thus, even if a malicious party may attack and compromise one symmetric key (e.g., for an attachment), the other symmetric keys remain intact (e.g., for other objects associated with the message).

The system can generate a universally unique identifier for identifying data or portions of the data. For example, the system (e.g., sending device) may split a large file into two portions and generate a unique identifier for the larger portion. The system may send the unique identifier to a receiving device and the server. The unique identifier functions as a key to a distributed hash table. This distributed hash table can be implemented over multiple servers. The distributed hash table stores the association between the stored data and the unique identifier. The receiving device can send a query with the unique identifier to any server that implements the distributed hash table and/or stores a copy of the data. Note that the unique identifier is optionally stored via a distributed lookup table including but not limited to a distributed hash table. The receiving device can retrieve the data from any number of servers since the data may be replicated and stored on multiple servers.

Next, the sending device can send a large encrypted (or unencrypted) portion of the message and/or content of a predetermined size to an enterprise server or a server in the cloud for storage (operation 208). For example, if the message includes a large file attachment, the sending device can encrypt the large file attachment, and split the file (encrypted or unencrypted) into two portions (e.g., the first 100 bytes of the file for small portion and the remainder of the file for the large portion). The sending device can then send the bigger portion of the file attachment to a server that the receiving device can retrieve from. The system may retain the small portion of the data and store it locally within a secure storage of the system, and, in some embodiments, can also include a copy of the small portion when sending a message. Without the small portion of the data, the receiving device (and malicious attackers) may not be able to put together the complete set of data. In some embodiments, the sending device can split the encrypted file (or an unencrypted file) into multiple portions that include more than two portions, and the portions can vary in size. For example, there can be many small pieces, one large and one small, one large and several small, etc. Furthermore, the server may also send the entire encrypted large file attachment or content to a server.

The system may send a large portion of the encrypted (or unencrypted) file to a server that is one of many enterprise hardware devices within an enterprise computing environment, or the server can be part of the messaging and computing system. In some embodiments, the system may also access a server of a cloud service (e.g., Dropbox or Google cloud storage) on the Internet to send and store data.

The sending device may then send the message and/or content, which may include rules, permissions, the unique identifier, the security object, the small portion of the encrypted (or unencrypted) file (or a link to the small portion), and/or any other data to the receiving device (operation 210). In some embodiments, the sending device may send contact information, passwords, lists, and draft messages to other users, encrypted or unencrypted, and may revoke the information at a later time or based on a condition set by the user of the sending device.

If the sending device receives a user command to perform an operation on the message and/or content (operation 212), the sending device may send the command to the receiving device to execute the command (operation 214). In some embodiments, the receiving device can also forward the command to other devices that have been forwarded the message.

In some implementations, the sending device may receive data from a computing device indicating they received a copy of the forwarded message. The sending device may directly send the command to any device that has received a copy of the forwarded message. Devices that receive the command may then comply with the command.

Receiving Message and/or Content

Figure 3:
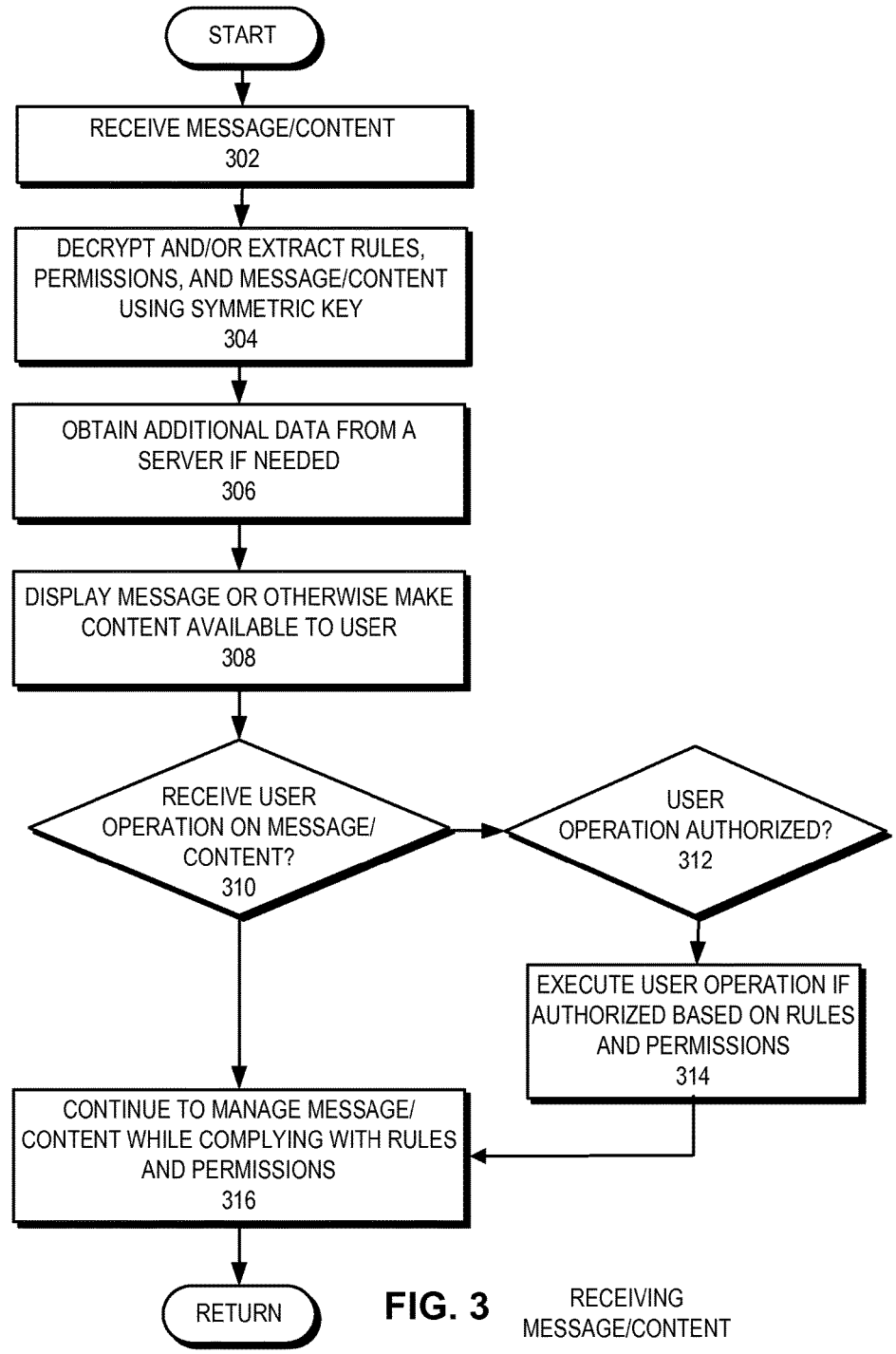
FIG. 3 presents a flowchart illustrating a method for receiving a message and/or content in accordance with an embodiment.

FIG. 3 presents a flowchart illustrating a method for receiving a message and/or content in accordance with an embodiment. Note that different embodiments may vary according to order of operations, and embodiments are not limited to the specific operations depicted in the figure.

A receiving device may initially receive the message and/or content (operation 302). The receiving device may receive the message and/or content from a device that originally sent the message and/or content, or from a device that forwarded the message and/or content. The receiving device may receive the message via a messaging server. The message and/or content may be encrypted (or unencrypted) and the receiving device may decrypt and/or extract various data from the message and/or content received. This data may include one or more of rules, permissions, a universally unique identifier, a link to a substantial portion of an encrypted (or unencrypted) large file attachment or content stored on a remote server, a small portion of the encrypted (or unencrypted) large file attachment or content (e.g., a small .zip file), a security object, and/or any other data included with the message (operation 304). In some embodiments, the receiving device may receive a link to a small portion of a large file attachment or other content, and query a server for the small portion rather than receive the small portion with the message.

The receiving device may obtain additional data from a server if the message and/or content indicates that a portion of a large encrypted (or unencrypted) file is stored elsewhere (operation 306). For example, if the message includes a large file attachment, then the receiving device may retrieve a large encrypted (or unencrypted) portion of the file attachment from a remote server. The receiving device sends the unique identifier to one or more servers over the network and then receives the corresponding data back from a server. The receiving device can retrieve the stored data (e.g., large file attachment or other content) from any one of multiple servers that replicate the additional data. The receiving device may then combine together the split portions of the large file attachment or content. If the receiving device can successfully decrypt an entire encrypted file, then the receiving device has obtained the correct data. For example, if the portions are encrypted, then the full encrypted file is a combination of an encrypted piece and an encrypted remainder. The full encrypted file can then be decrypted using the symmetric key whereas the encrypted piece or encrypted remainder would fail to decrypt independent of each other. The big portion (e.g., remainder file) may be publicly available on Dropbox, a web server, etc. A diff file (e.g., a much smaller portion) may be securely transmitted or stored somewhere. The receiving device may apply the diff file to the remainder file to generate a file equal to the original file (encrypted or not). Note that in some scenarios, a device may combine together portions of an unencrypted file.

Note that multiple servers may implement a distributed hash table storing associations between the universally unique identifier and objects such as file attachments or content. The unique identifier may function as a lookup key for the distributed hash table. The servers can look up the distributed hash table to identify the correct object to return to a device that submits a query using a corresponding unique identifier.

The distributed hash table may also store public keys for users or receiving devices, so that a sending device can request a public key for any potential recipient. The sending device can obtain public keys for multiple recipients, and may send each recipient the same symmetric key but the symmetric key is encrypted using each recipient's specific public key. Each recipient can decrypt and extract the symmetric key using their own specific private key.

Since the stored data is replicated and distributed on different servers, there are multiple ways in which the receiving device can obtain the stored data. In some embodiments, the receiving device can attempt to retrieve the stored data by sending a query with the unique identifier key to a local hardware device or an enterprise computing device. The local hardware device may return the data or may provide the receiving device with information on servers that store the data and their respective download speeds, including which servers provide fastest download speed. The receiving device can attempt to retrieve the stored data by submitting a query to servers with access to the distributed hash table and/or stored copies of the data, and receiving data from a server that is known to be trusted. The receiving device can also retrieve data by sending the query with the unique identifier key to a server that is part of the messaging and communication system (e.g., the software as a service). In some cases it may be faster for the receiving device to access an enterprise hardware device to retrieve data over a local area network but if the receiving device does not have access to the enterprise hardware device, then the receiving device can access the data from the software as a service.

The receiving device may then display the message or otherwise make the content available to the user of the receiving device (operation 308).

If the receiving device receives user input indicating an operation on the message and/or content (operation 310), the receiving device may determine whether the operation is authorized based on the rules and permissions (operation 312). If the operation is authorized, then the receiving device may execute the operation on the message and/or content (operation 314). The receiving device continues to manage the message and/or content while complying with the rules and permissions (operation 316). For example, the receiving device may determine when to delete an object based on a rule associated with the object. As another example, the receiving device may receive subsequent requests to perform operations on the message and/or content and the receiving device may only perform such operations when authorized by the permissions and rules.

Anonymously Accessing External Service

Figure 4:
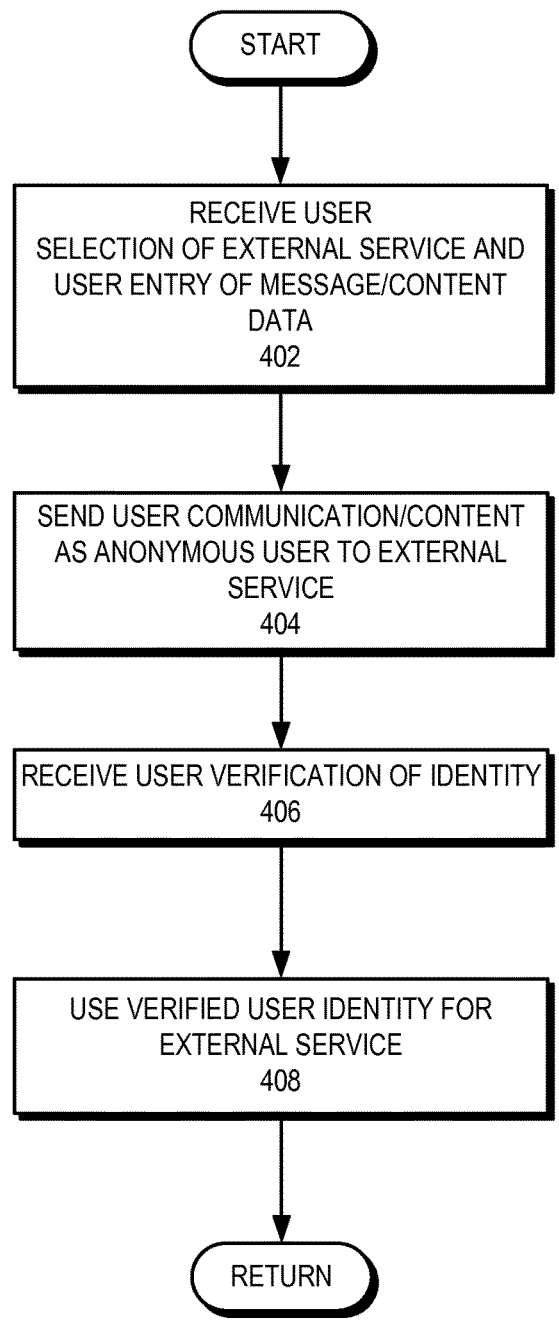
FIG. 4 presents a flowchart illustrating a method for anonymously accessing an external service in accordance with an embodiment.

FIG. 4 presents a flowchart illustrating a method for anonymously accessing an external service in accordance with an embodiment. Note that different embodiments may vary according to order of operations, and embodiments are not limited to the specific operations depicted in the figure. Further, some embodiments may execute the process of FIG. 4 entirely on a mobile device, while in other embodiments, a mobile device may use a server to anonymously access external services.

The system may include a zero-login feature that allows a user to add and use an external service, such as a social networking service, without logging in to the external service. The external service can be any service provider, such as Twitter or an SMS text messaging service provider. The system acts as a proxy to allow the user to anonymously access the external services. For example, the user can anonymously use the social networking service to contact (e.g., e-mail or text message) or send data to others until the user wants to authenticate his identity with the social networking service. The system provides the user with an anonymous user ID and the user only needs to indicate the identity of the other party that the user wants to communicate with. The other party sees the message coming from the anonymous user ID. In one embodiment, the receiving party receives a message with a link, and the message informs the receiving party that an anonymous user is trying to communicate with the receiving party or send a file to the receiving party. The receiving party may then click the link to view the message or obtain the file.

In some embodiments, the user can authenticate himself to the system using a login associated with an external service, such as an e-mail address, a Twitter account, or a Facebook account. The system can verify that the user owns the login account on the external service. The system can also verify how other users can message the user via the external service using the login (e.g., e-mail address, SMS number, social user name, etc.). After the user authenticates himself for a particular external service, the system may reveal the true identity of the user on the external service to the recipients of anonymous communications and/or other data from the user. After the user's identity is revealed, the user would directly receive messages and content data from other users on the external service.

During a zero-login process, the system may initially receive a user selection of an external service and user entry of a message and/or content (operation 402). The user may also select content from his local device or on a network. The system may then send the user communication and/or content as an anonymous user to the external service (operation 404). For example, the system may send the message "how are you?" to another user on a social networking service. The other user will receive the message but without any information identifying who was the sender.

The system may then receive user input verifying the user's identity for a particular external service (operation 406). The system may verify the user identity with the external service. The system may then use the verified user identity for the external service (operation 408).

Setting Rules for New Message

Figure 5:
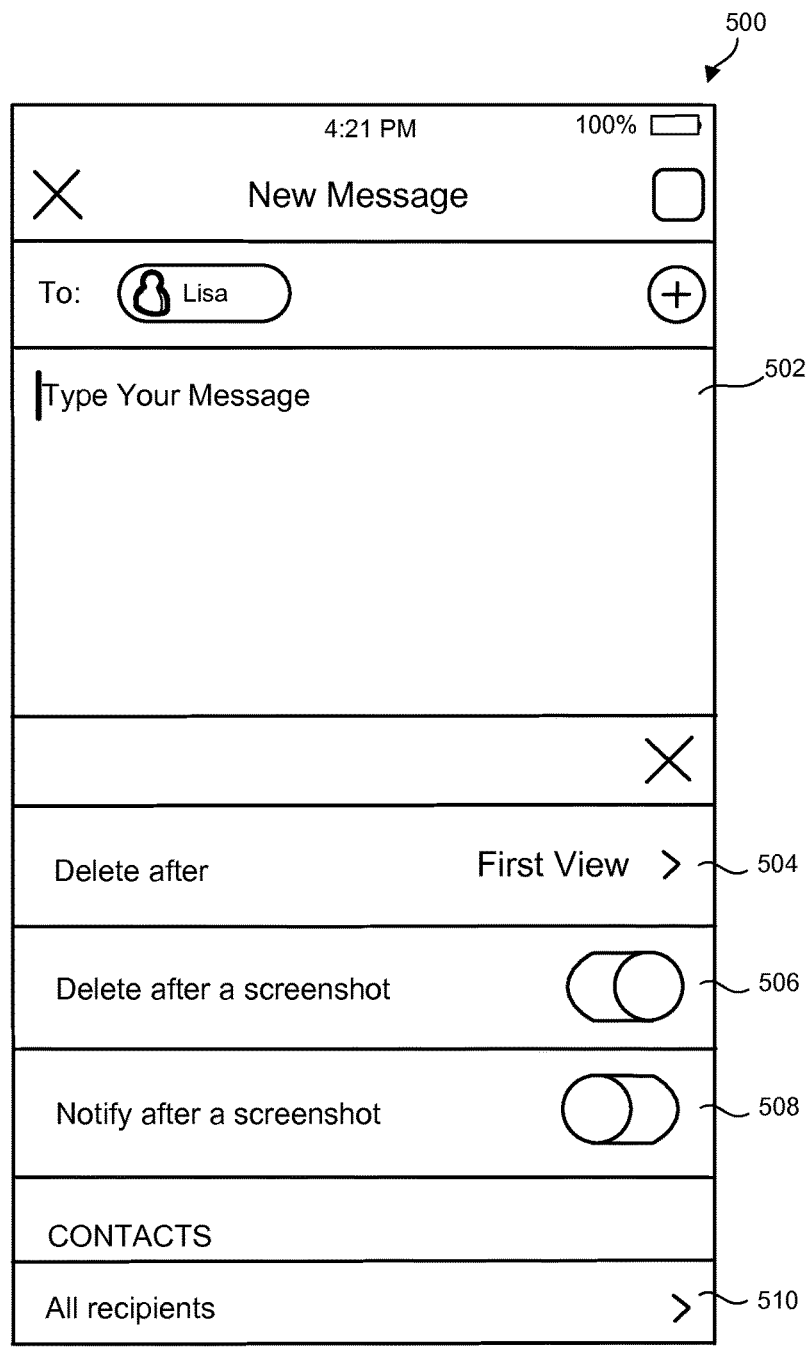
FIG. 5 presents an illustration of a screen that allows a user to set rules for a new message in accordance with an embodiment.

FIG. 5 presents an illustration of a screen that allows a user to set rules for a new message in accordance with an embodiment. As illustrated in FIG. 5, a screen 500 displays a new message text entry area 502. The message is addressed to a recipient Lisa. The user can set when the system will delete the message. On the depicted screen the user has adjusted the "delete after" setting 504 so that the system (e.g., a receiving device) will delete the message after a receiving party first views the message. Also, the user can adjust a "delete after a screenshot" switch 506 (e.g., currently enabled) so that the system will delete the message after the receiving device takes a screenshot of the message. The user can also adjust a "notify after a screenshot" switch 508 so that the sending party is notified of any screenshots taken by receiving parties. On the depicted screen, switch 508 is set to a disabled position so the sending party is not notified of screenshots taken by receiving parties. The system includes a setting 510 that allows the user to select whether the rules apply to all recipients or a selection of recipients.

Change Permissions on Recipients of New Message

Figure 6:
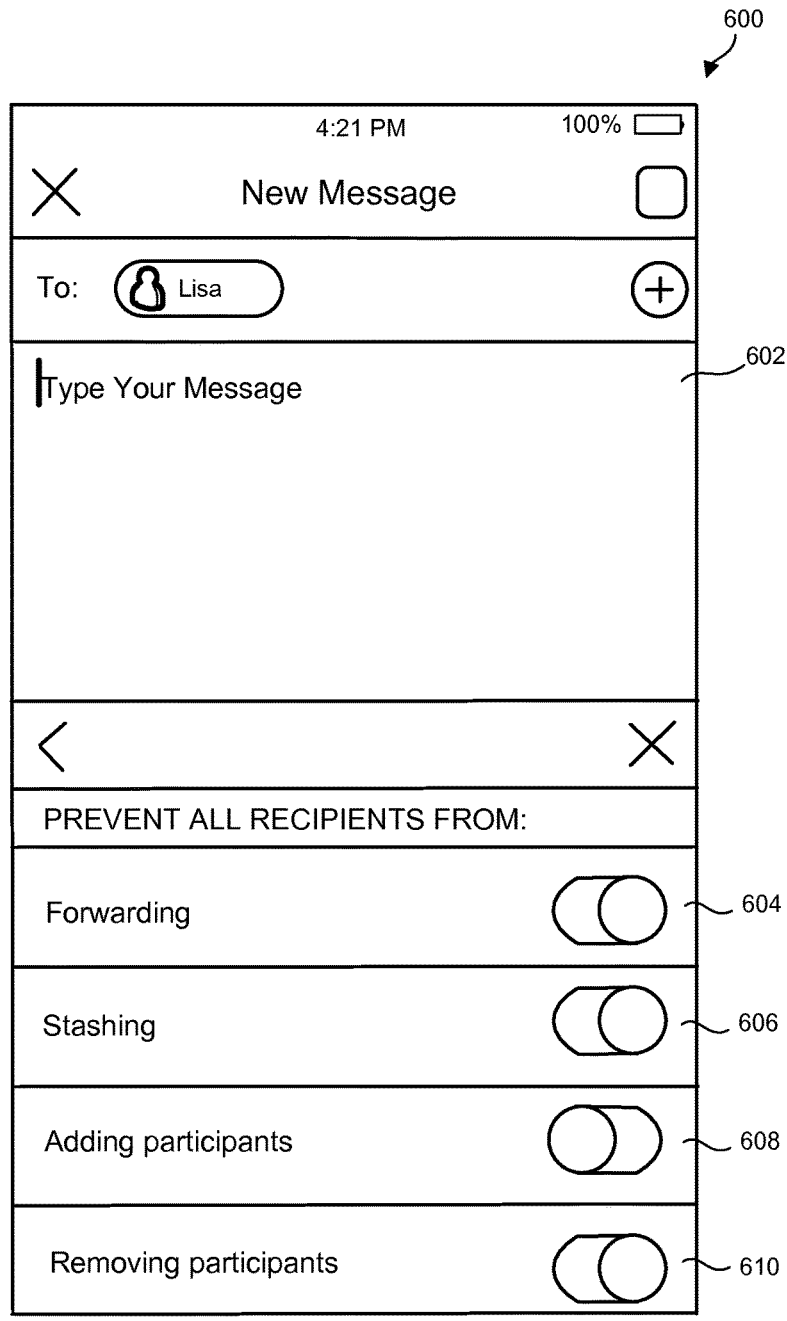
FIG. 6 presents an illustration of a screen that allows a user to change permissions on all recipients of a new message in accordance with an embodiment.

FIG. 6 presents an illustration of a screen that allows a user to change permissions on all recipients of a new message in accordance with an embodiment. As illustrated in FIG. 6, a screen 600 displays a message text entry area 602. The message is addressed to a recipient Lisa. The user can adjust a forwarding switch 604 (e.g., currently enabled) to allow other users to forward the message, and can adjust a stashing switch 606 (e.g., currently enabled) to allow other users to stash (e.g., archive or move to a folder for storage and/or classification) the message.

A stash is also a location synchronized across all user devices for message drafts, uploaded files, notes, passwords, objects etc. that may be then sent or shared via the platform. The stash may function as a virtual hard drive. Stash allows the user to save versioned objects of all types to the distributed system for later viewing, sharing, collaboration and group editing, and sending. A user can put his items in stash to have it appear on all of the user's other devices. Everything stored with stash may be encrypted. Only the user and the people that the user specifies may view/edit, etc. and have the power to roll back to old versions, view thumbnails (e.g., similar to the attachment view), and search/sort in a manner similar to messages and attachments. Some examples of stash features include but are not limited to message drafts, files, and notes.

Message drafts—these are messages a user started to compose and wishes to resume editing on a different device or pass off to a different user to edit. The message draft may or may not be encrypted, and the sender and any shared viewers/editors may be given various levels of permissions to access the message draft. Multiple versions can be saved and rolled back, and the user can view the differences between versions, etc. Some embodiments can also support files that have been uploaded to the system and attached but not sent.

Files—this is a very safe and secure file hosting service. A user can upload one-to-many files and folders, assign permissions on who can view/access/edit, assign tags to classify a file, and set reminders to perform some action on the file. Some embodiments may also support all versioning features, roll back viewable differences, etc.

Notes—includes, but is not limited to, free form text, pictures, video, Global Positioning System (GPS) location, maps, voice, etc. with note-taking capability. Users can tag, attach files, assign permissions, set reminders, and use versioning capability.

The user can also adjust a switch 608 to allow other users to add participants (e.g., currently disabled), and can adjust a "removing participants" switch 610 (e.g., currently enabled) to allow other users to remove participants. Note that the user can also change permissions for a single recipient or any set of recipients. Other examples of permissions include but are not limited to printing, selecting text, and external downloading.

Hierarchical Display of Group Messages

Figure 7:
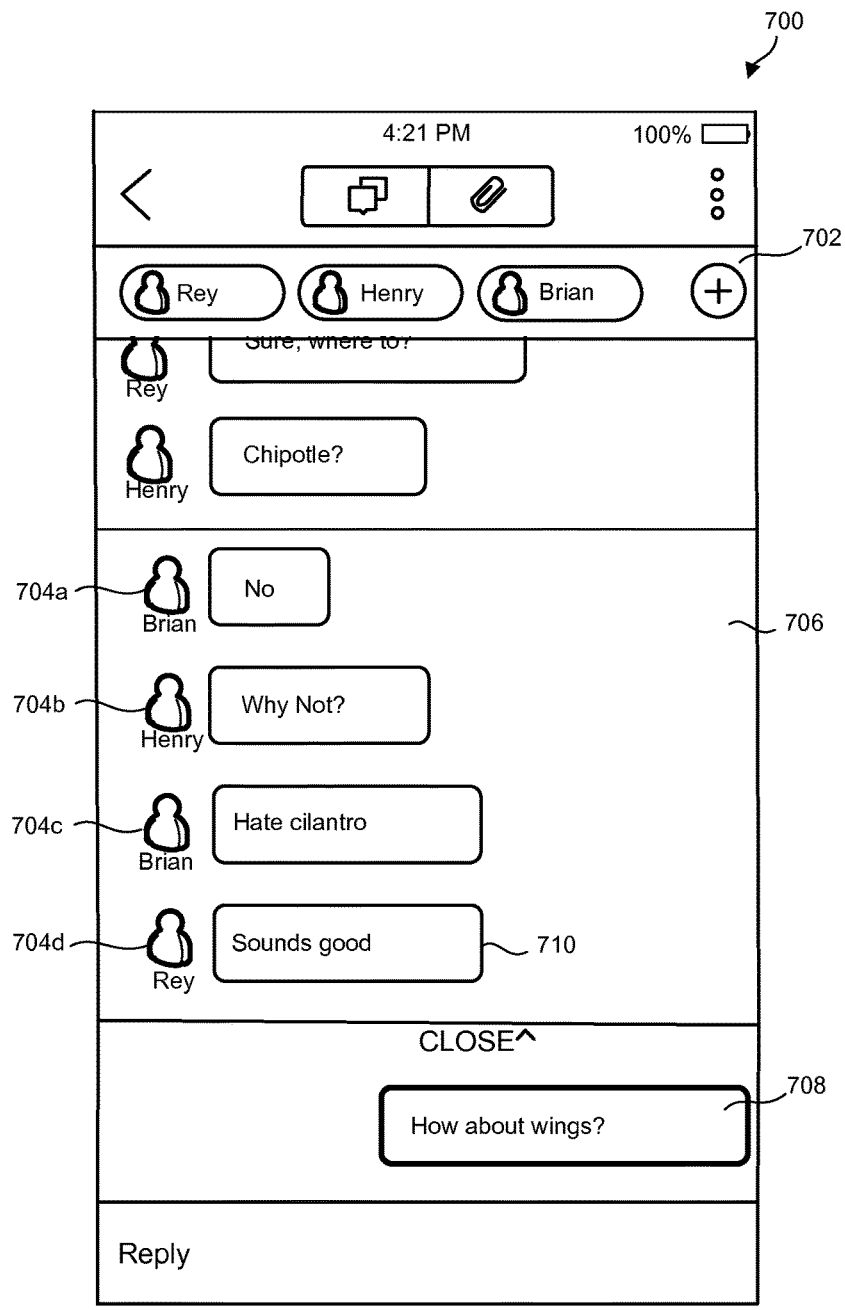
FIG. 7 presents an illustration of a screen that shows an exemplary hierarchical display of group messages in accordance with an embodiment.

FIG. 7 presents an illustration of a screen that shows an exemplary hierarchical display of group messages in accordance with an embodiment. The system may also include a hierarchical structure and hierarchical display for group messaging. The system manages and stores group messaging data using a hierarchical structure. This hierarchical display utilizes a tree structure to illustrate the threads of a conversation when multiple users are communicating with each other. The user may then easily follow the threads of the group conversation and see who is responding to whom in the conversation. Existing group messaging software typically only displays a scrolling interface that displays each message as a user sends out the message. It is difficult for a user to follow the different threads of a group conversation with existing group messaging software.

As illustrated in FIG. 7, a screen 700 displays a group messaging session between users Rey, Henry, and Brian. The three users are represented in the users panel display 702. The messages in the group messaging session can be organized in a hierarchical display. This hierarchical display resembles a tree structure that allows the user to easily follow the conversation threads, since replies to a message are displayed as nested within (e.g., branching off from) the message.

A picture or other user icon (e.g., pictures 704a, 704b, 704c, 704d) depicting each user and a corresponding message may be indented within screen area 706 to show responses to Henry's question. For example, the user can more easily follow the responses to Henry's question (e.g., "Chipotle?") since the responses in screen area 706 are indented to show that the responses are nested within the original question. In some implementations, the screen area 706 may be shaded with light grey highlight or some other shading or color to indicate responses to Henry's question. A message input box 708 allows a user to input a question to send to participants in the messaging group (e.g., "How about wings?").

In some implementations, a user may click on a reply message in a conversation thread to cause the system to display the original message that the reply message is directed at. For example, a user may click on a message display box 710 displaying "Sounds good" and then the system will pop-up and display the original message that started the thread (e.g., "Chipotle?"). The system may display the pop-up visual indicator indicating the content and sender for the message "Chipotle?" that started the thread. The system may also respond to the user clicking on the pop-up visual indicator by navigating to the original message "Chipotle?" and graying out the reply messages in the thread. This makes it easier to navigate business-oriented threads with a large number of messages. Some embodiments may also display a fork in a thread when a user forwards a message.

Figure 8:
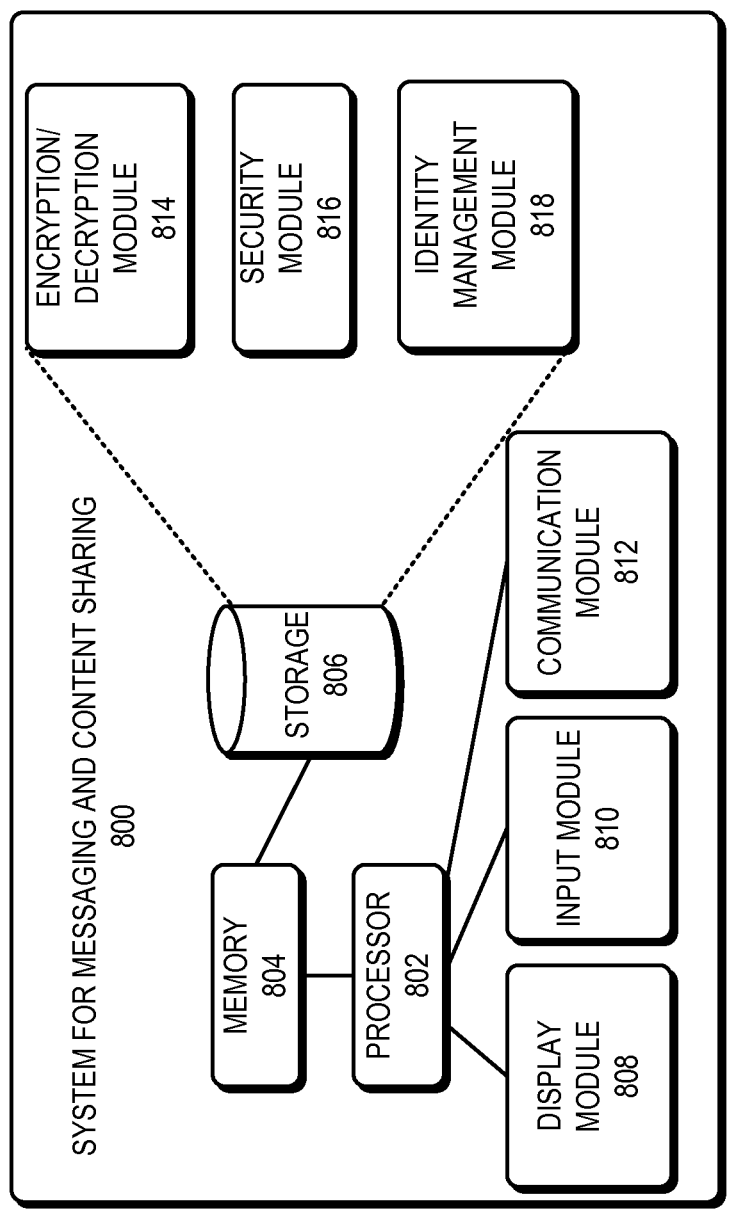
FIG. 8 illustrates an exemplary computer system that facilitates a messaging and content sharing platform with sender-controlled security in accordance with an embodiment. In the figures, like reference numerals refer to the same figure elements.

FIG. 8 illustrates an exemplary computer system that facilitates a messaging and content sharing platform with sender-controlled security in accordance with an embodiment. In this example, a system 800 for messaging and content sharing can include but is not limited to a processor 802, a memory device 804, and a storage device 806. System 800 may optionally include a display module 808, an input module 810, and a communication module 812. In some embodiments, system 800 may be implemented on a mobile device, and in other embodiments, one or more components of system 800 may also be implemented on another computing device, such as a server.

Storage device 806 can store instructions which when loaded into memory 804 and executed by processor 802 cause processor 802 to perform the aforementioned operations (e.g., for a sending device or a receiving device). More specifically, the instructions stored in storage device 806 can include an encryption/decryption module 814, a security module 816, and an identity management module 818.

Encryption/decryption module 814 encrypts and decrypts objects such as messages, attachments, and other content objects. Security module 816 manages the rules and permissions associated with objects. Identity management module 818 verifies the identity of the user. It can verify the identity of the user with external services such Twitter, e-mail, and Facebook. Identity management module 818 can also act as a proxy for the user when the user seeks to use external services anonymously. In some embodiments, identity management module 818 may be implemented on a server, and a mobile device may interact with a server executing identity management module 818 to access external services anonymously.

Delivering Secure Messages Over Unsecured Channels

The relentless growth of the Internet has brought with it an ever increasing demand for applications that facilitate to conduct various types of transactions online. Secure communications, among other things, are becoming progressively important to service providers. Over the past few decades, a number of systems for delivering secure messages over unsecured channels have been developed. For example, there exist a number of public key infrastructure (PM) systems that can issue digital certificates which facilitate two communicating entities to encrypt their messages.

Simply encrypting messages, however, might not be sufficient. For example, even when messages (such as emails) are encrypted between two communicating entities, the cipher text is often transmitted over an open, unsecured channel, and the sending and receiving parties' identities are also known to the public. Such information can be used by a malicious user to decrypt the cipher text (for example, by using brute-force dictionary-based cracking methods).

In many situations it is desirable to obscure secure communications between a sender and a recipient with a cover message. Traditionally, the cover message has been manually generated, typically by the sender or on the sender's behalf. The cover message might be based on a template or form, with a customized salutation or address specific to the recipient. The manual process is time-consuming and may require personal knowledge by the sender of context relevant to the recipient for the cover message to appear personal. Other automated cover-message generation methods are often impersonal and the messages generated are easy to spot as form or bulk cover messages.

Controlling Access to Encrypted Data

Embodiments of the present invention also provide an access-control device (hardware box) that solves the problem of protecting an entity's online communication and shared documents from being accessed by unauthorized entities. Using the access-control device, a user can communicate over a messaging framework (e.g., via email, a short message service (SMS), or an instant messaging service, etc.) or in-real time over a voice line (e.g., VoIP) using encrypted messages, and the access-control device can ensure that only authorized entities are able to decrypt the encrypted messages.

Moreover, the user can communicate over an existing third-party online social-media service, such as Twitter or Facebook, and the access-control device can ensure that only other authorized entities can view the protected content posted by the user. The access-control device can secure the content from eavesdroppers, such as the third-party online service itself, or any malicious entity that gains illegitimate access to the third party service's servers.

Hence, the access-control device can function as a user add-on to any existing online service, to protect the user's communication over that online service. For example, when communicating over email or an instant messaging service, a local user can generate a message that includes a file or document as an attachment. In some embodiments, the access-control device can generate a new message that includes a benign statement and/or benign attachment in plaintext (un-encrypted) form that "masks" or "cloaks" the user's protected content, and can include the attachment in encrypted form (or can include a link to the encrypted content). This benign content is meant to distract an eavesdropper from the protected content by satisfying the eavesdropper's curiosity, and hiding the fact that the message includes an attachment. If the eavesdropper does not become aware of the protected content, the eavesdropper may not be motivated to crack the decryption of the protected content.

Hence, the access-control device allows the user to communicate with others over existing communication platforms that are typically implemented in a client-server architecture, while also protecting the user's communication. The user's client computer can generate and send a message to the server, and the server can send the message to a specific client that is authorized to access the content (e.g., via a push transaction, or in response to a pull request), or can publish the content for multiple clients to access. The access-control device can reside anywhere in the computer network between the user's client computer and the third-party server. In some embodiments, the access-control device can be a network switch, router, or firewall for a secure local area network (LAN). Alternatively, the user can configure his client computer or a router to use the access-control device as a proxy server for the client computer.

Exemplary Network Environment

Figure 9:
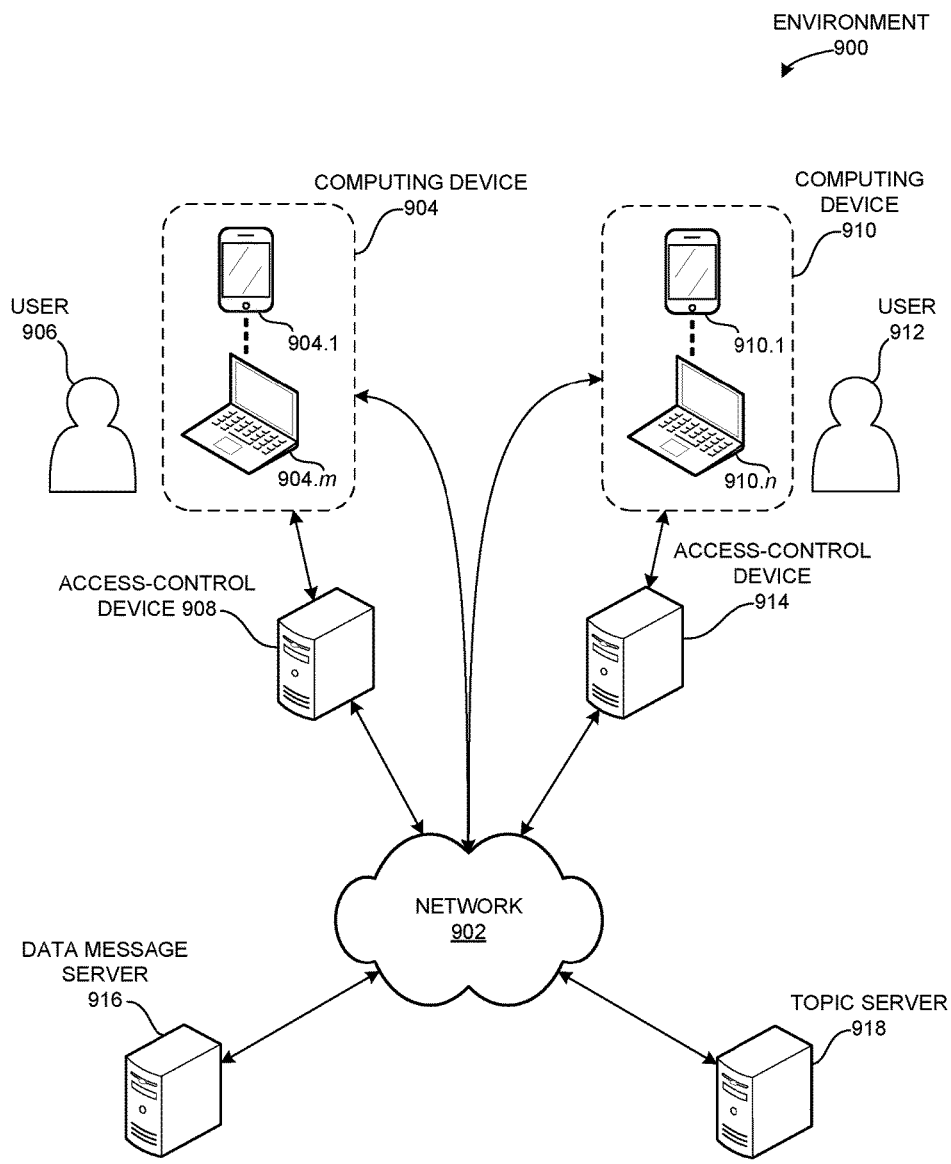
FIG. 9 illustrates an exemplary network environment that facilitates protecting a user's communications over a computer network in accordance with an embodiment.

FIG. 9 illustrates an exemplary network environment 900 that facilitates protecting a user's communications over a computer network in accordance with an embodiment. Network environment 900 can include a computer network 902, which can include any wired or wireless network that interfaces various computing devices to each other, such as a computer network implemented via one or more technologies (e.g., Bluetooth, Wi-Fi, cellular, Ethernet, fiber-optic, etc.). In some embodiments, network 902 includes the Internet.

Network environment 900 can also include a computing device 904, which a user 906 uses to communicate a message or data to another user 912 or his computing device 910. During communication, one computer typically needs to send data to another computer, oftentimes using a large data file or data stream. For example, data for a conference call can include an audio stream and/or a video stream. Sometimes the communication can include additional data that may aid the communication, such as a presentation slide or deck, a webcast, a document, etc.

Computing device 904 can be a smartphone 904.1, a personal computer 904.$m$, or any device that needs to send or publish data over network 902. In some embodiments, user 906 can assign an access-control device 908 to computing device 904, which computing device 904 can use to protect the local user's data from being accessed by unauthorized entities. Similarly, user 912 can assign an access-control device 914 to computing device 910.

In some embodiments, access-control devices 908 and 914 can be members of a distributed hash table (or block chain) that can store digests for cover messages generated by any sending device. By storing these cover message digests, access-control devices 908 and 914 can confirm whether a benign message received by a receiving device is in fact a cover message. In one embodiment, a receiving device can send a benign message digest to access-control device 908 or access-control device 914, which in turn can compare the received digest with its stored digests to determine whether the benign message is a cover message or just a regular benign message.

Access-control device 908 can sit between computing device 904 and a messaging server 916 which computing device 904 uses to communicate with user 912. One advantage of this configuration is that messaging server 916 can speed up the transmission process between computing device 904 and computing device 910. Another advantage is that access-control device 908 can act as a repository for keys to the communication data, and computing device 904 only sends a portion of the encrypted communication message to data message server 916. Computing device 904 can leave a small percentage of the encrypted message on access-control device 908 itself. For example, when computing device 904 needs to send a message, computing device 904 may first encrypt the message locally, and extracts a portion of the encrypted message (e.g., 99%) to produce a corrupt version of the encrypted message. Computing device 904 may then transmit the corrupted encrypted message to message server 916, and transmits an access key that includes the extracted portion to access-control device 908. Hence, even though message server 916 receives the encrypted messages, message server 908 does not have all the data that is necessary to make use of these encrypted messages.

Topic server 918 can be responsible for collecting topics from any device in the network. In one embodiment, topic server 918 can distribute to the devices a generic topic list. Such a list might be based on, for example, the current popular topics in the news, sports, entertainment industry, etc. A respective device may download this generic list from topic server 918. In addition, the device may perform data mining on the user's local contextual data, such as the user's emails, calendar entries, chat history, text message history, web browsing history, etc., to determine whether a topic in the generic topic list is relevant to the user. In addition, the device can send a relevant topic list, which contains all the pertinent topics based on the user's contextual information, to topic server 918. In turn, topic server 918 can store each user's relevant topics. In one embodiment, a respective relevant topic list may be indexed by the corresponding user's identifier. Such an identifier can be a phone number, an email address, a social network media ID, or a globally unique identifier that topic server 918 generates for the user.

A remote computing device 910 associated with the intended recipient user 912 can obtain the encrypted message by first determining which pieces of data need to be received for the user by issuing a request to topic server 918. Topic server 918 can return a list of messages that computing device 910 may have in common with computing device 904. At this point, computing device 910 can issue a request to data message server 916 to obtain the corrupt encrypted message, and can issue a request to access-control device 908 to obtain an access key that transforms the corrupt encrypted message into the original encrypted message. In some embodiments, the key can include the data segments that computing device 904 extracted from the original encrypted message to produce the corrupt encrypted message.

One major advantage to this communication approach is that the sending device (e.g., computing device 904) can use any messaging server with a high network bandwidth to send or distribute a message or file to one or more recipients, without risking the data becoming compromised or leaked via these messaging servers. The access-control device can remain in the sender's possession (e.g., within an at-home local area network (LAN)), and may only need to send a small portion of the message or file (e.g., 1%) to the intended recipients via the user's own wide area network (WAN) connection.

Another major advantage to this approach is that it becomes impossible for a malicious entity to decrypt the sending device's messages, regardless of how much computing power the malicious entity uses to attempt to decrypt the sending device's data stored on the message server. While it is virtually impossible to decrypt a message that is encrypted using a large encryption key using modern computers, it may become possible to decrypt this encrypted content in the near future with future computing technologies. For example, advances in quantum computing threatens to undermine the security of modern encryption technologies by having the quantum computer attempt all possible (or a significant percentage thereof) encryption keys at once to decrypt a piece of encrypted content.

However, because the access-control device can retain key segments of the encrypted data, and the user can be in possession of the access-control device, the user in essence may retain complete control over his encrypted data. Therefore, because a malicious entity is not able to get a hold of the extracted segments of the encrypted data, the malicious entity may not have all the information necessary to even begin the decryption process. If the malicious entity were to attempt to decrypt the modified encrypted data with the valid decryption key, the malicious entity may only obtain a corrupted message that does not reveal any information of the original plaintext message.

In some embodiments, the sending device can push the message (or a large portion of the message) to each intended recipient ahead of time, without having to first receive a request for this message from the recipients. This allows the message to become available at the recipients' devices before they even become aware of the message, and allows them to quickly access large messages (e.g., multi-gigabyte video streams) without having to first request and download the message. When a recipient wishes to consume the message, the recipient's computer can issue a request for the remaining small portion of the message (e.g., a key containing 1% of the message), at which point the recipient's device downloads the remaining small portion and uses this portion to reconstruct the original message.

In some embodiments, the extracted portions of message data retained by the access-control device (and not sent to the message server) is determined based on a minimum amount of data and locations of the data that, if missing, would render it impossible to decypher any comprehensible data from the remaining portions of the data. For example, the system can determine an amount of data to extract based on a size of an encrypted file or message. Also, the system may determine which strategic locations of the file are to be used to extract the portions of the file based on the type of data (e.g., an audio or video stream, or a document), the type of encoding (e.g., size of data chunks for a data stream), and/or the encryption algorithm used.

For example, if the encrypted data is a data stream that is encoded and encrypted in segments, the minimum amount of data that needs to be removed from the encrypted data may correspond to the individual segments of the encrypted data stream. If the segments are 1 MB (megabytes) in size, the system may extract a 1 KB (kilobyte) portion from each 1 MB (megabyte) segment, to render the new segments corrupted and unreadable. If the data stream is encoded into variable-size segments, the location and portion of the encrypted data stream from which the system extracts data may vary according to the location and size of each segment in the encrypted data stream.

In some further embodiments, the system can vary the location of each encrypted data stream segment that is used to extract data, to prevent a malicious entity from performing a predictive attack. For example, the system can decide on which portion is to be extracted at runtime while generating the corrupted version of the encrypted data stream. Also, the system can store the segment number and byte offset of the extracted portion, along with the extracted portion, in the access-control device. Then, when an authorized receiving entity requests the extracted portion, the access-control device can return the extracted portion, along with a patch that the recipient can apply to the binary data stream (corrupt data) to recreate a segment of the encrypted data stream. The patch may include, for example, instructions that specify a stream timestamp or byte offset, or specify a stream segment number and a byte offset, that the receiving device can use to insert the extracted portion into the binary data stream to recreate the segment of the encrypted data stream.

Note that, although the exemplary network environment illustrated in FIG. 9 includes a message server 916 and a topic server 918 as separate systems (which might or might not be located in different locations), these servers can also reside in a common hardware system or datacenter. In one embodiment, the functions of these two servers can be carried out by a common physical server.

Figure 10:
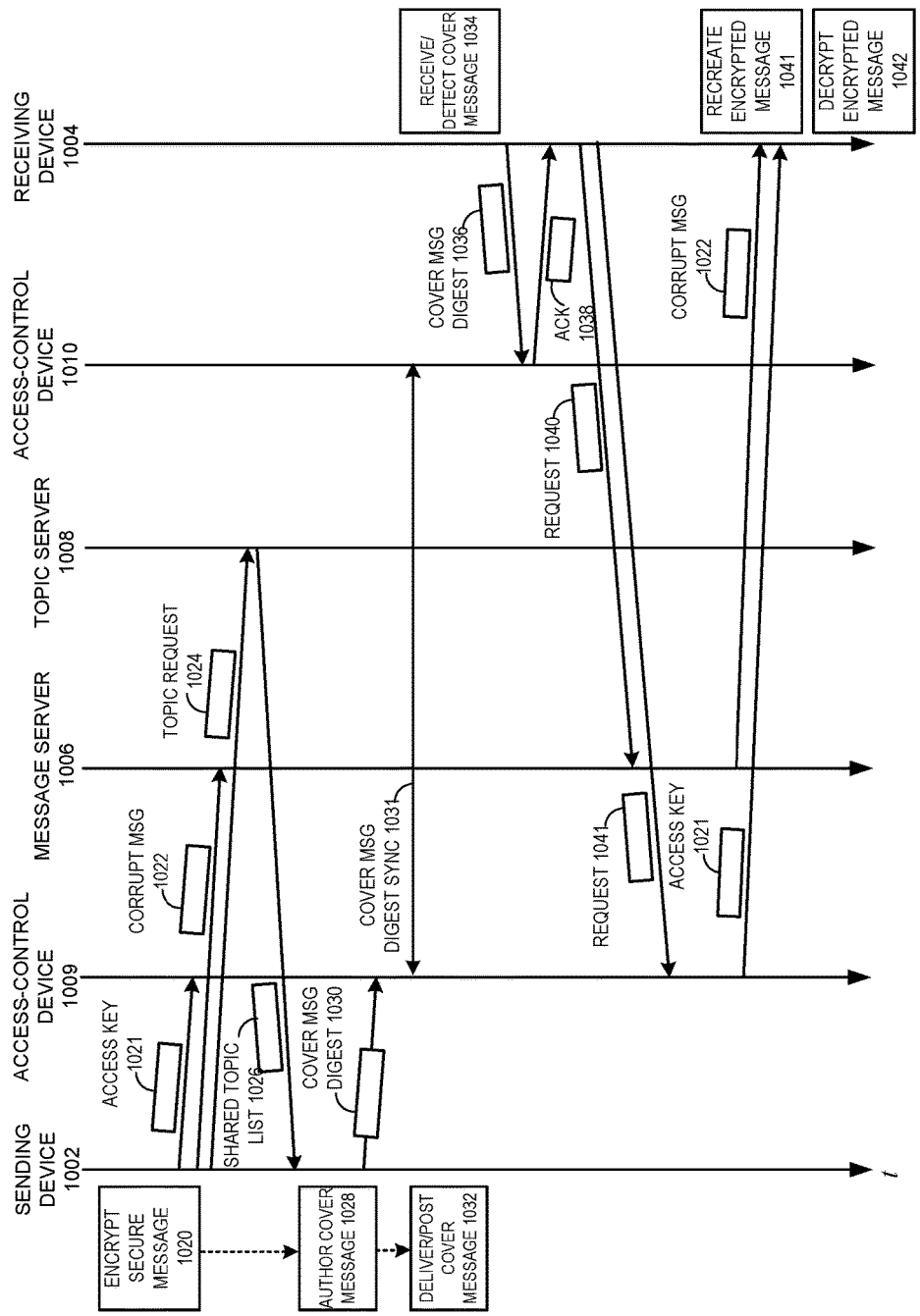
FIG. 10 presents a time-space diagram illustrating an exemplary process for automatically generating context-aware cover messages in accordance with an embodiment.

FIG. 10 presents a time-space diagram illustrating an exemplary process for automatically generating context-aware cover messages in accordance with an embodiment. In this example, assume that a sending device 1002 needs to send a secure message to a receiving device 1004, and that a public/private key pair has already been distributed between sending device 1002 and receiving device 1004. During operation, sending device may 1002 first encrypt the secure message with receiving device 1004's public key (operation 1020), and may generate a partial message that includes a corrupted version of the secure message by extracting one or more segments of the secure message. Sending device 1002 may then generate an access key that includes the one or more extracted segments of the secure message.

Sending device 1002 then sends corrupted message 1022 (e.g., a partial message) to a message server 1006, and sends the access key to access-control device 1009. At approximately the same time, sending device 1002 may send a topic request 1024 to a topic server 1008. The purpose of sending topic request 1024 is to obtain a list of common topics shared between sending device 1002 and receiving device 1004. In one embodiment, topic request 1024 can include an identifier for sending device 1002 and an identifier for receiving device 1004.

In response topic request 1024, topic server 1008 can send a shared topic list 1026 to sending device 1002. Note that shared topic list 1026 can include any topic that is relevant to the respective users of sending device 1002 and receiving device 1004. For example, shared topic list 1026 might include latest news of a local sports team, a recently released film, popular news topics, popular music, etc.

After receiving shared topic list 1026, sending device 1002 can author a cover message (operation 1028). To author the cover message, sending device 1002 can select one topic from topic list 1026, and can automatically generate a piece of content based on the selected topic. Various methods can be used to generate the content, which can be a combination of text, pictures, and other medium form. In one embodiment, sending device can issue a search to the Internet with the selected topic as a search key word, and crawl the search results to generate the content.

Subsequently, sending device 1002 can generate a cover message digest 1030, for example, by computing a hash value of the cover message. Sending device 1002 may then send cover message digest 1030 to access-control device 1009, which in turn may store cover message digest 1030. Recall that access-control device 1009 can implement a distributed hash table with one or more other access-control devices. In some embodiments, access-control device 1009 can synchronize the local hash values (or block chain) with one or more other access-control devices, such as an access-control device 1010 associated with receiving device 1004.

Furthermore, sending device 1002 can deliver or post the cover message (operation 1032). Note that the cover message can be delivered to receiving device 1004 in various ways. For example, the cover message can be sent as an SMS message, an email, a blog post, a social network media entry (such as a Twitter or Facebook entry). The user of sending device 1002 can set a preference for the delivery of the cover message, or can select a delivery medium at the time the user generates and sends the message.

In some embodiments, access-control device 1009 can author cover message 1028 and deliver/post cover message 1032 on behalf of sending device 1002.

In response, receiving device 1004 can receive or detect the cover message (operation 1034). In one embodiment, receiving device 1004 may be pre-configured to monitor certain communication channel(s), such as SMS messages, incoming emails, a certain blog, or a certain social network media channel. Once the cover message is received, receiving device 1004 may compute a hash for the cover message to produce cover message digest 1036. Next, receiving device 1004 can send cover message digest 1036 to cover message server 1010, which can search its storage to determine whether cover message digest 1036 matches with any previously stored digest. Cover message server 1010 may then send an acknowledgement 1038 back to receiving device 1004 to confirm whether cover message digest 1036 indicates that receiving device 1004 has in fact received a real cover message, instead of a regular benign message.

After confirming that the cover message indicates the availability of a secure message for receiving device 1004, receiving device 1004 may subsequently send a request 1040 to message server 1006 to request corrupted message 1022, and may send a request 1041 to access-control device 1009 to request access key 1021. Note that receiving device 1004 may be required to authenticate itself with necessary security credentials (such as a password or a digital certificate), either prior to or along with request 1040 and request 1041. In addition, request 1040 and request 1041 can include receiving device 1004's identifier, which message server 1006 may use to locate corrupted message 1022, and which access-control device 1009 may use to local access key 1021. In response to receiving a valid request 1040, secure message server 1006 may transmit encrypted message 1022 to receiving device 1004. Also, in response to receiving a valid request 1041, access-control device 1009 may transmit access key 1021 to receiving device 1004. Receiving device 1004 may then use the corrupt encrypted message 1022 and access key 1021 to recreate encrypted message (operation 1041), and may then proceed to decrypt encrypted message 1041 using its private key (operation 1042).

Sending Device

Figure 11:
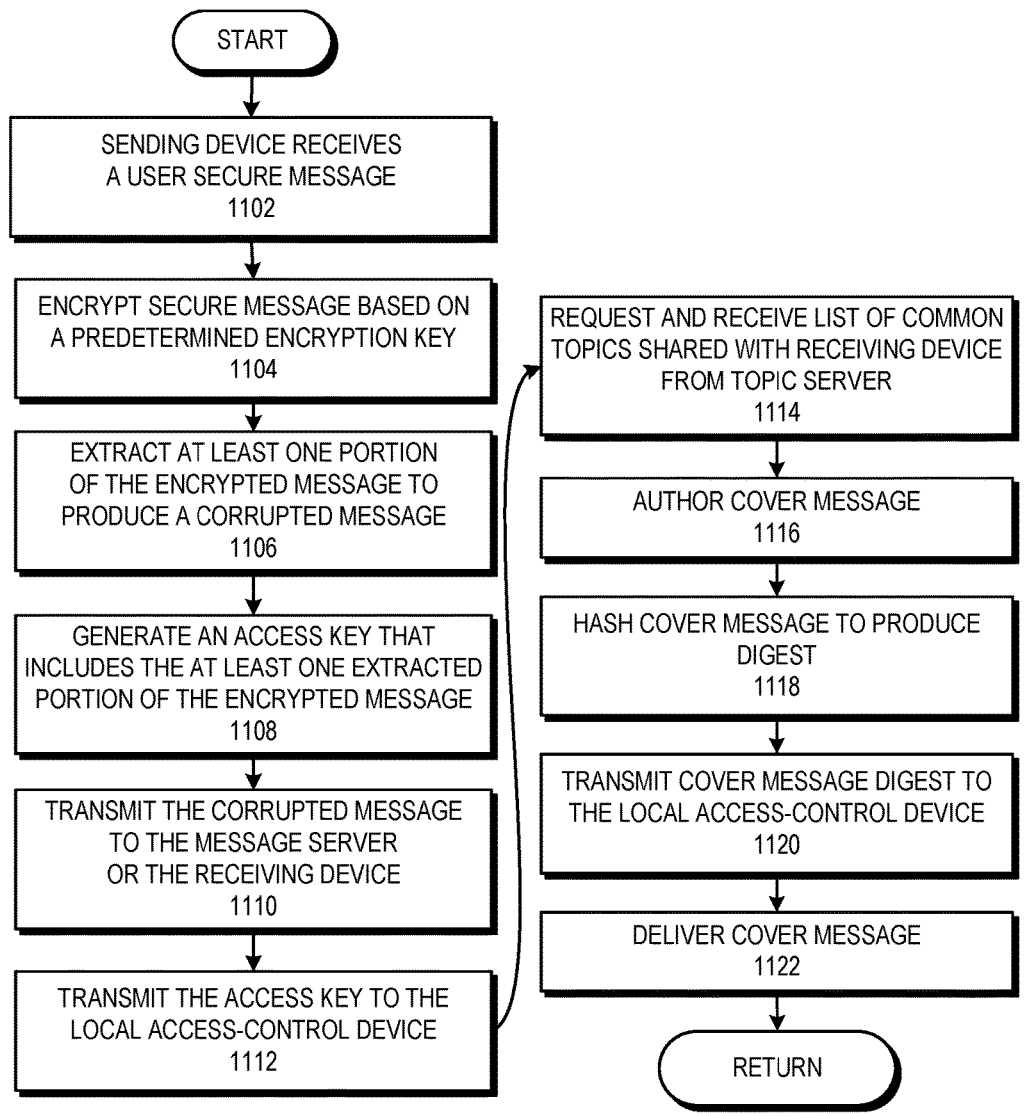
FIG. 11 presents a flowchart illustrating a method for automatically generating a context-aware cover message in accordance with an embodiment.

FIG. 11 presents a flowchart illustrating a method for automatically generating a context-aware cover message in accordance with an embodiment. During operation, the sending device can receive a secure message from the user (operation 1102), and can encrypt the secure message based on a previously distributed key pair (e.g., the receiving device's public key) (operation 1104).

Next, the sending device can extract at least one portion of the encrypted message to produce a corrupted message (operation 1106), and can generate an access key that includes the at least one extracted portion of the encrypted message (operation 1108). The sending device may then transmit the corrupted message to the message serve or to the receiving device (operation 1110), and may transmit the access key to the local access-control device (operation 1112).

Subsequently, the sending device can request and receive a list of common topics shared with the receiving device from the topic server (operation 1114). The sending device can then author a cover message based on one or more topics shared with the receiving device (operation 1116). The sending device can also hash the cover message to produce a digest (operation 1118), and can transmit the cover message digest to the cover message server (operation 1120). The system can use various hashing methods, such as SHA-512. Next, the sending device may deliver the cover message (operation 1122). In some embodiments, the cover message can be delivered by a third party, instead of by the sending device.

Figure 12:
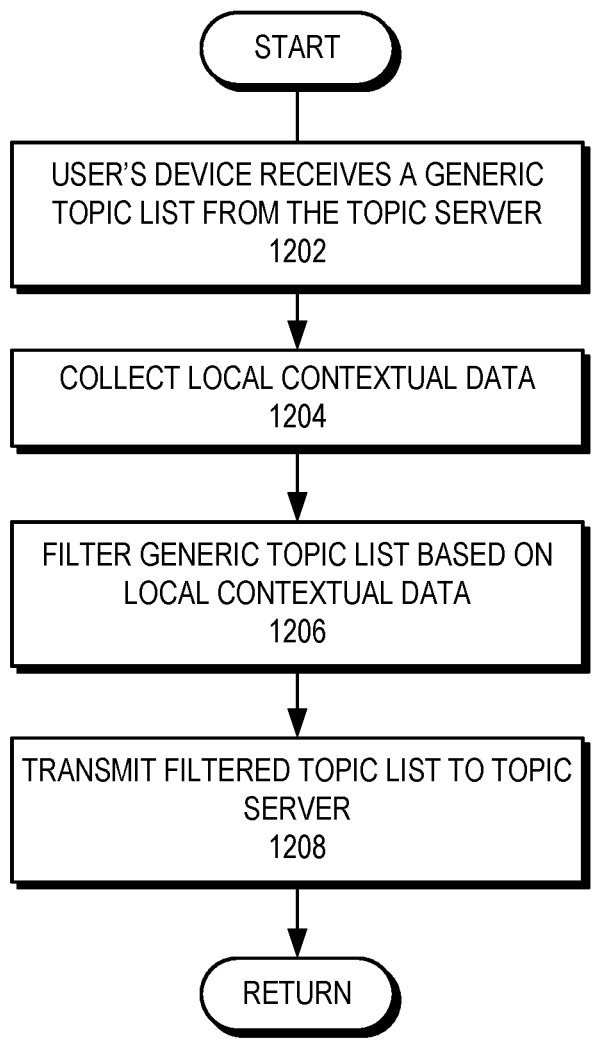
FIG. 12 presents a flowchart illustrating a method for uploading, to a topic server, a list of topics relevant to local context in accordance with an embodiment.

FIG. 12 presents a flowchart illustrating a method for uploading, to a topic server, a list of topics relevant to local context in accordance with an embodiment. In general, a sending or receiving device may first receive a generic topic list from the topic server (operation 1202). Note that the topic server can regularly search the Internet to compile the generic topic list. The device may then collect local contextual data (operation 1204), such as by scanning the local user's emails, SMS messages, chat history, blog entries, social media content history, web browsing history, etc.

Next, the device can filter the generic topic list based on the local contextual data (operation 1206). The device may subsequently transmit the filtered topic list back to the topic server (operation 1208).

Access-Control Device

Figure 13:
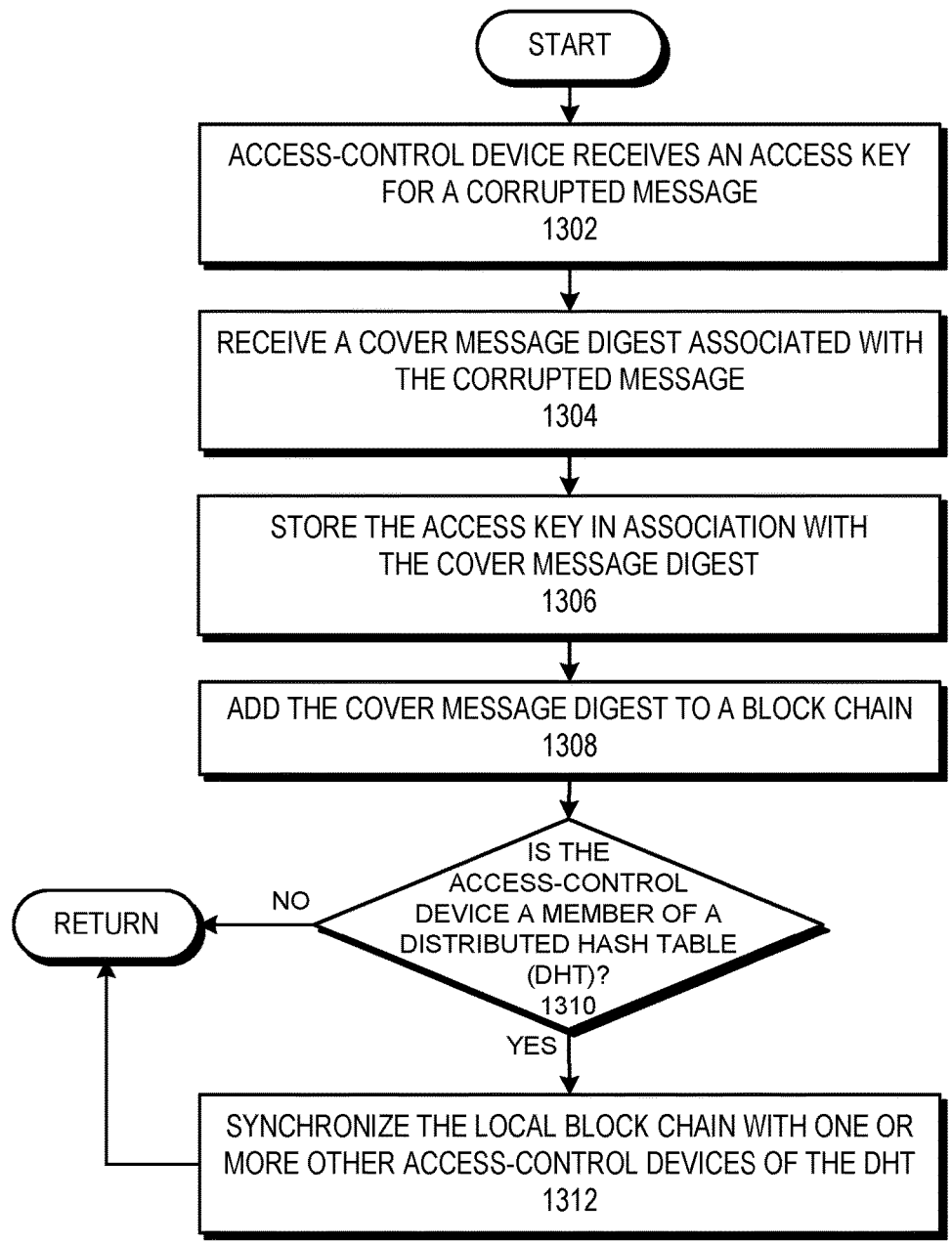
FIG. 13 presents a flowchart illustrating a method for creating a block chain entry for a secure message in accordance with an embodiment.

FIG. 13 presents a flowchart illustrating a method for creating a block chain entry for a secure message in accordance with an embodiment. During operation, an access-control device can receive an access key for a corrupted message from a sending device (operation 1302), and receives a cover message digest associated with the corrupted message (operation 1304). The access-control device then stores the access key in association with the cover message digest (operation 1306). For example, the access-control device can store the access key in a lookup table or relational database, using the cover message digest as the index for the access key.

In some embodiments, the access-control device uses a block chain to store the cover message digests. Also, the access-control device can be a member of a distributed hash table that is implemented across a plurality of access-control devices. Hence, the access-control device can add the cover message digest to the local block chain (operation 1308). The access-control device also determines whether the local access-control device is a member of a distributed hash table (operation 1310). If so, the local access-control device can synchronize the local block chain with one or more other boxes of the distributed hash table (operation 1312).

Receiving Device

Figure 14:
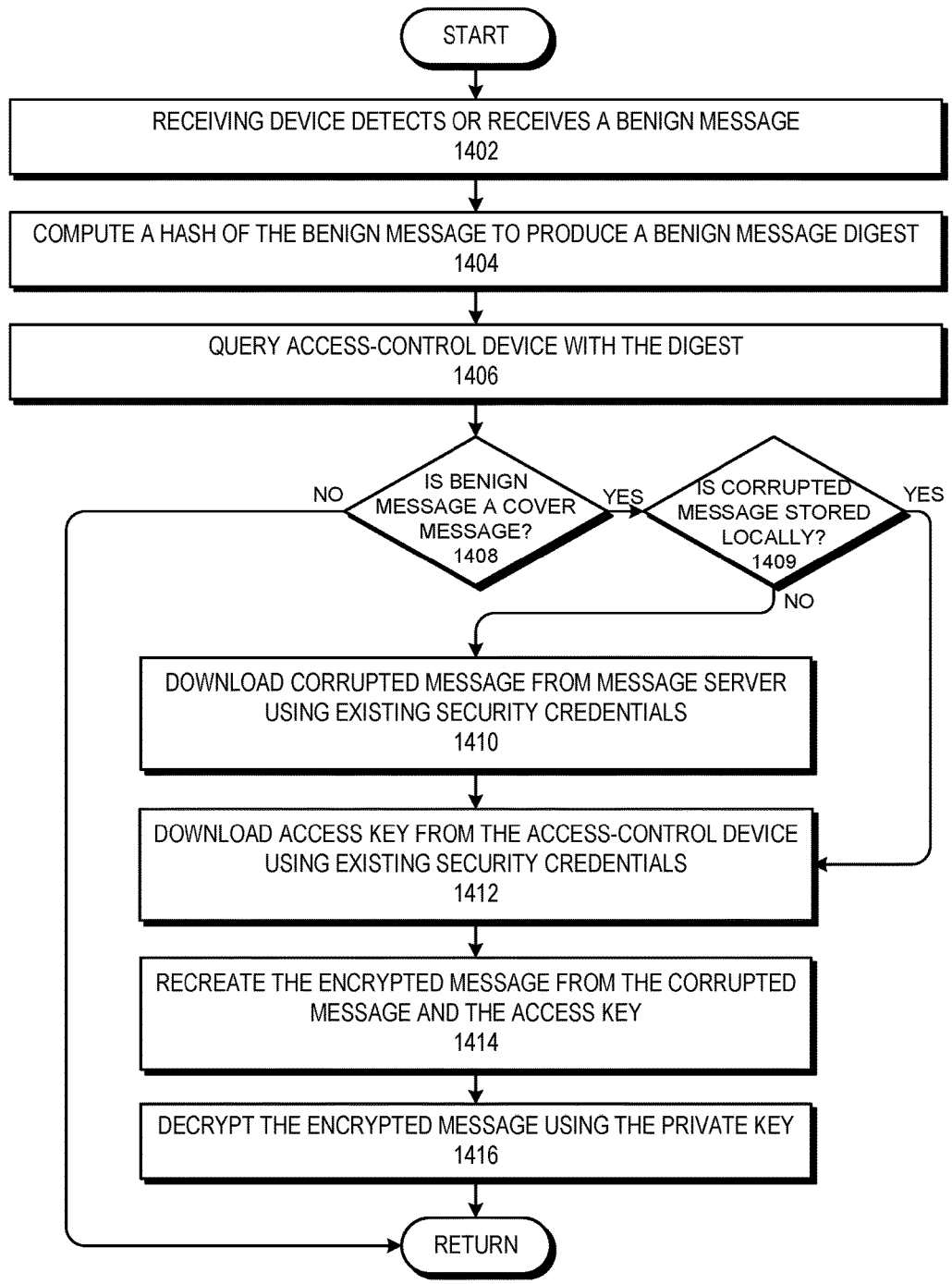
FIG. 14 presents a flowchart illustrating a method for receiving a cover message and obtaining a corresponding secure message in accordance with an embodiment.

FIG. 14 presents a flowchart illustrating a method for receiving a cover message and obtaining a corresponding secure message in accordance with an embodiment. During operation, a receiving device can detect or receive a benign message by monitoring one or more communication channels (operation 1402). The receiving device computes a hash of the benign message to produce a benign message digest (operation 1404). Note that some hashing methods (such as the SHA-512 hashing method) can be computationally expensive on a general-purpose processor.

In some embodiments, a dedicated, special-purpose piece of hardware (such as an application-specific integrated circuit (ASIC) or field programmable logic array (FPGA)) is used to perform the hashing function. The receiving device then queries the access-control device with the computed digest (operation 1406). Based on the response from the cover message server, the receiving device determines whether the benign message is a cover message (operation 1408). If the benign message is not a cover message, the receiving device does not perform any special operation.

If the benign message is a cover message, the receiving device determines whether the corrupted message is already stored locally (operation 1409). If the corrupted message is not stored locally, the receiving device may download the corrupted message from the message server using its existing security credentials (operation 1410), and downloads the access key from the sender's access-control device using the existing security credentials (operation 1412). In some embodiments, the sending device may push the corrupted message directly to the receiving device. The receiving device does not need to download the corrupted message at the time the user wishes to view the message. Hence, if the corrupted message is already stored locally, the receiving device can proceed to operation 1412 to download the access key without first having to request or download the corrupted message.

Recall that the access key can include one or more data portions that were extracted from an encrypted message to produce the corrupted message. The receiving device can create the encrypted message from the corrupted message and the access key (operation 1414), and can decrypt the encrypted message using its private key (operation 1416).

In some embodiments, the receiving device can also be configured to use an access-control device to receive and cache data being transmitted by the sending device. For example, the access-control device associated with the receiving device can obtain the corrupted encrypted data, can request and receive the extracted portions of the encrypted data, and can re-insert the extracted portions into the corrupted encrypted data to recreate the original encrypted data on behalf of the receiving device.

Moreover, the receiving device's access-control device can obtain and cache (or store) the recreated encrypted data ahead of time, so that the encrypted data is available for the receiving device when the receiving device requests the encrypted data. For example, the message server, the sending device, or the sending device's access-control device can push the corrupted message to the receiving device's access-control device. The receiving device's access-control device can recreate the encrypted data upon receiving the push message.

As another example, the receiving device's access-control device can pre-fetch data from a third-party online service, such as an email server, an on-line social media service (e.g., Twitter, Facebook, etc.). In some embodiments, one or more message servers implement the third-party online service. In some other embodiments, the message server can host encrypted data that is being transferred along with (and "masked" by) a message published via the third-party online service. When the receiving device's access-control device receives a corrupted message from the message server, the access-control device can determine a network address for another access-control device associated with the corrupted message (e.g., the sending device's access-control device), and can issue a request to this network address to obtain the access key or the extracted portion of the corrupted message.

Furthermore, the receiving device can also be configured to use an access-control device to protect data published or transmitted by the receiving device. For example, a local user and a remote user can implement secure two-way communication by each configuring an access-control device to secure data on behalf of the user. An access-control device that is managed by the local user can store extracted portions of the local user's data (e.g., 1% of the data), and can provide these extracted portions to the remote user's device upon request. Similarly, an access-control device that is managed by the remote user can store extracted portions of the remote user's data, and provides these extracted portions to the local user's device upon request. This provides two advantages to the two-way communication: communication becomes secure and only accessible to the local and remote users; and the computational overhead of securing their communication is offloaded to the two access-control devices that may have more computational and energy resources than the personal computing devices used by the local and remote users.

Distributed Framework

In some embodiments, a plurality of access-control devices can cooperate to form a distributed framework that can store data in encrypted form for a user, and can validate the authenticity of each other's stored data. Moreover, the access-control devices of the distributed framework can store cove message digests for messages that have been made accessible to a receiving device.

In some embodiments, a cover message digest is a "hash code" that pairs with a piece of encrypted message. For example, the distributed framework can group one or more cover message digests into a "block" that is stored across the access-control devices in the distributed framework, such that each block includes a set of validated cover message digests. Moreover, the blocks stored in the distributed framework can be block chained, so that each block in the block chain includes a digest (e.g., a hash value) for the next block in the block chain. Storing the cover message digests as a distributed block chain can allow tampered blocks to be detected. For example, if a malicious entity were to tamper with a block in one access-control device, the access-control device can determine that the block has been tampered with by comparing the block's hash value with the hash value stored in the previous block of the block chain. The access-control device can perform a remedial action, for example, by requesting a validated copy of the block from other access-control devices of the distributed framework, and replacing the tampered-with block with the validated copy.

Moreover, other access-control devices of the distributed framework can detect the tampered-with block by comparing its hash value with that of the other access-control devices in the framework. The distributed framework can also perform a remedial action, such as by removing the tampered-with access-control device from the distributed framework.

In some embodiments, the distributed framework can include access-control devices owned or managed by a plurality of individual users or organizations. The security of the distributed framework can increase as more access-control devices and more trustworthy entities join the distributed framework.

In some other embodiments, a single organization or entity can create a proprietary distributed framework by configuring a plurality of personal access-control devices to implement a distributed hash table or block chain amongst themselves, without allowing an access-control device that is not owned by the entity to join the distributed framework. The access-control devices that are within the distributed framework may reside within a secure local area network (LAN) or virtual private network (VPN) that is secured and managed by the organization or entity. For example, the organization may deploy multiple access-control devices at each office building that is owned or managed by the organization, and can configure the proprietary distributed framework to secure all communication performed by any member or employee of the organization.

This ensures that all communication performed by the organization's members can be validated during the communication event. For example, the distributed framework can validate all real-time communication (e.g., a voice or video conference call) by ensuring that only authorized receiving devices can listen in on the communication. As another example, the distributed framework can track email messages sent to other entities, and can validate a request to read an email message body from a receiving device that received a corrupted version of the email message. Moreover, the organization can modify a list of recipients for an already-sent message, for example, by rejecting a request for the extracted portion of a message when a recipient has been removed from the list of allowed recipients, or when the message is being read after a predetermined time window (e.g., the message content has become stale).

The access-control devices can communicate the cover message digest as a distributed hash, in a distributed fashion without requiring a central server to serve as a central authority for validated cover message digests. For example, the sending device can make the cover message digest available for the receiving device via any existing communication or social-media service, such as in a message on a social-media posting or in an email message. When a receiving device obtains the cover message digest, the receiving device can verify the authenticity of the cover message digest by sending a validation request to any trusted access-control device of the distributed framework. If the cover message digest is valid, the access-control device may return an acknowledgement (ACK) message, which acknowledges that the cover message digest is valid. Otherwise, the access-control device may return a negative acknowledgement (NACK) message which indicates that the cover message digest is not valid, or may perform another predetermined remedial action.

In some embodiments, if the user behind the receiving device has an access-control device that is a member of the distributed framework, this access-control device can include a copy of the block chain or distributed hash table of all valid cover message digests. Hence, the receiving device can send the validation request to the local access-control device to determine whether the cover message digest is valid.

If the receiving device receives an ACK message, the receiving device can proceed to obtain the corrupted encrypted message from a remote server or device (e.g., a secure message server, or any access-control device of the distributed framework), to obtain the extracted segments of the encrypted message, to recreate the original encrypted message, and to decrypt the encrypted message. However, if the receiving device receives a NACK message, the receiving device can alert the user that the message does not appear to be authentic or trustworthy. The user can ask the sender to submit a new valid cover message digest, or may choose to proceed to download and decrypt the encrypted message at the user's own risk.

Figure 15:
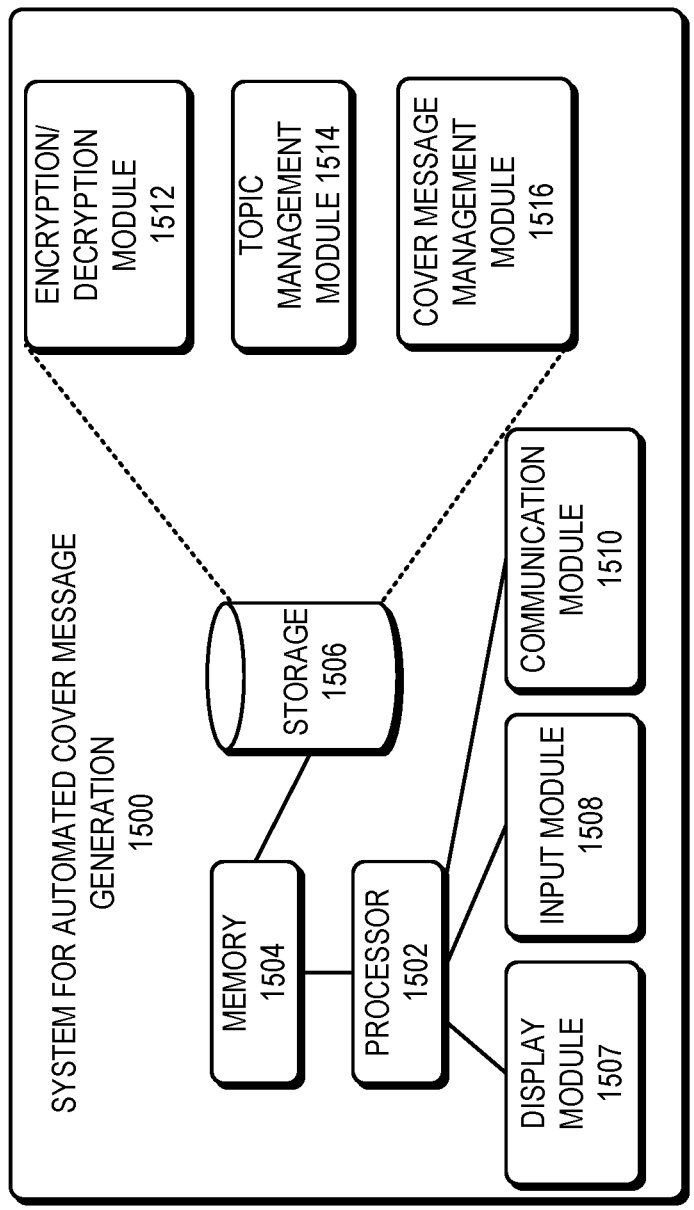
FIG. 15 illustrates an exemplary computer system that facilitates automatic generation of context-aware cover messages for secure communication in accordance with an embodiment.

FIG. 15 illustrates an exemplary computer system that facilitates automatic generation of context-aware cover messages for secure communication in accordance with an embodiment. In this example, a system 1500 for automated cover message generation can include a memory device 1504, a processor 1502, a storage device 1506, a display module 1507, an input module 1508, and a communication module 1510.

Storage device 1506 can store instructions which when loaded into memory 1504 and executed by processor 1502 cause processor 1502 to perform the aforementioned operations (for a sending device, a receiving device, or both). More specifically, the instructions stored in storage device 1506 can include an encryption/decryption module 1512, a topic management module 1514, and a cover message management module 1516. Encryption/decryption module 1512 is responsible for encrypting and decrypting a secure message. Topic management module 1514 is responsible for uploading locally filtered topic list to the topic server, and receiving a shared topic list with respect to a particular receiving device from the topic server. Cover message management module 1516 is responsible for generating a context-aware cover message and computing a digest for a generated or received cover message.

Exemplary Embodiments

One embodiment of the present invention provides a personal computing device that can push data objects to one or more intended recipients. During operation, the computing device can obtain a data object being published by a user. The computing device can generate a partial message that includes a subset of the data object, and can send the partial message to an intended recipient of the data object, without first receiving a request for the data object from the intended recipient.

In some embodiments, the intended recipient can include a remote personal computing device, a remote personal storage device, and/or a storage server.

In some embodiments, the computing device can generate an access key that includes at least one section of the data object that are not in the partial message, and may send the access key to an access-control device that controls access to the data object, or to a storage server.

In some embodiments, while generating the partial message, the computing device can identify, from the data object, one or more data blocks that are to be made corrupt. The computing device may then extract segment of a respective data block to make the respective data block corrupt, and may combine the corrupt data blocks to form the partial message.

In some embodiments, the computing device can generate a cover message for the data object, and can send the cover message to the intended recipient to facilitate the intended recipient to obtain the data object based on the cover message.

In some variations on these embodiments, the computing device can generate a digest from the cover message, and can send the digest to an access-control device that controls access to the data object.

In some embodiments, the cover message can include an email message, a short message service (SMS) message, an instant messaging (IM) message, a message posted on a social media service, and/or an audio recording.

In some embodiments, the computing device can encrypt the data object using a predetermined encryption key to produce an encrypted message. Moreover, while generating the partial message, the computing device can obtain the at least one sections from the encrypted message, and can generate the partial message to include the at least one sections of the encrypted message.

Another embodiment of the present invention includes a non-transitory computer-readable storage medium storing instructions that when executed by a computer cause the computer to perform a method, the method comprising: obtaining a data object being published by a user; generating a partial message that includes a subset of the data object; and sending the partial message to an intended recipient of the data object, without first receiving a request for the data object from the intended recipient.

In some embodiments, the intended recipient includes one or more of: a remote personal computing device; a remote personal storage device; and a storage server.

In some embodiments, the method performed by the computer also includes generating an access key that includes at least one section of the data object that are not in the partial message; and sending the access key to an access-control device that controls access to the data object, or to a storage server.

In some embodiments, the method performed by the computer according to the stored instructions may further include generating the partial message involves: identifying, from the data object, one or more data blocks that are to be made corrupt; extracting a segment of a respective data block to make the respective data block corrupt; and combining the corrupt data blocks to form the partial message.

In some embodiments, the method performed by the computer according to the stored instructions may further include generating a cover message for the data object; and sending the cover message to the intended recipient, which facilitates the intended recipient to obtain the data object based on the cover message.

In some embodiments, the method performed by the computer according to the stored instructions may further include generating a digest from the cover message; and sending the digest to an access-control device that controls access to the data object.

In some embodiments, the cover message includes one or more of: an email message; a short message service (SMS) message; an instant messaging (IM) message; a message posted on a social media service; and an audio recording.

In some embodiments, the method performed by the computer according to the stored instructions may further include encrypting the data object using a predetermined encryption key to produce an encrypted message; wherein generating the partial message involves: obtaining the at least one sections from the encrypted message; and generating the partial message to include the at least one sections of the encrypted message.

Another embodiment of the present invention includes an access-control device that can control access to encrypted messages. During operation, the access-control device can receive an access key for a data object being shared with at least one intended recipient, and a digest associated with the data object, and may store the access key and the digest in a look-up repository. In response to the device receiving a request for the data object from a remote device, the device may obtain a second digest from the request. Moreover, the device may analyze the second digest to determine whether the second digest is valid. In response to validating the second digest, the device may return the access key to the remote device.

In some embodiments, while storing the digest, the device may store the digest in a block chain. A respective block of the block chain can include at least one digest, and/or a hash value of a previous block of the block chain.

In some embodiments, the access-control device may be a member of a distributed hash table. Responsive to storing the digest in the block chain, the device may synchronize the block chain with at least one other member device of the distributed hash table.

In some embodiments, while returning the access key to the remote device, the device can perform a lookup operation, using the digest as input, to obtain an access key that includes the remainder of the data object. The access-control device can return the access key to the remote device.

In some embodiments, while validating the second digest, the device may perform a lookup operation in the block chain to determine whether the second digest exists in the block chain.

In some embodiments, the device can return a negative-acknowledgement (NACK) message in response to determining that the second digest does not exist in the block chain.

In some embodiments, the device can return an acknowledgement (ACK) message in response to determining that the second digest exists in the block chain.

In some embodiments, responsive to determining that the second digest exists in a block of the block chain, the device may validate the block. Responsive to determining that the block is valid, the device may return an acknowledgement (ACK) message.

In some embodiments, responsive to determining that the block is not valid, the device may return a negative-acknowledgement (NACK) message.

In some embodiments, while validating the block, the device can determine whether a neighboring block in the block chain includes a hash value that matches the block's hash value, and/or can determine whether the block and a corresponding block of a remote access-control device have matching hash values.

Another embodiment of the present invention may include an access-control device, comprising: a communication module operable to receive an access key for a data object being shared with at least one intended recipient, and a digest associated with the data object; a storage device operable to store the access key and the digest in a look-up repository;
a digest-lookup module operable to obtain a second digest from a request received from a remote device for the data object; a digest-validation module operable to validate the second digest; and an authorization module operable to return the access key to the remote device in response to the second digest being valid.

In some embodiments, the storage device is further operable to store the digest in a block chain, wherein a respective block of the block chain includes at least one digest, and a hash value of a previous block of the block chain.

In some embodiments, the access-control device is a member of a distributed hash table, and the storage device is further operable to, in response to storing the digest in the block chain, synchronize the block chain with at least one other member device of the distributed hash table.

In some embodiments, the authorization module is further operable to performing a lookup operation, using the digest as input, to obtain an access key that includes the remainder of the data object.

In some embodiments, the digest-validation module is further operable to perform a lookup operation in the block chain to determine whether the second digest exists in the block chain.

In some embodiments, the digest-validation module is further operable to: return a negative-acknowledgement (NACK) message, responsive to determining that the second digest does not exist in the block chain.

In some embodiments, the digest-validation module is further operable to: return an acknowledgement (ACK) message, responsive to determining that the second digest exists in the block chain.

In some embodiments, the digest-validation module is further operable to, responsive to determining that the second digest exists in a block of the block chain: validate the block; and return an acknowledgement (ACK) message responsive to determining that the block is valid.

In some embodiments, the digest-validation module is further operable to: return a negative-acknowledgement (NACK) message responsive to determining that the block is not valid.

In some embodiments, validating the block involves one or more of: determining whether a neighboring block in the block chain includes a hash value that matches the block's hash value; and determining whether the block and a corresponding block of a remote access-control device have matching hash values.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for sending an object comprising:
receiving the object at a sending device, wherein the object is a message or other content;
receiving user input at the sending device to set permissions and rules for the object, wherein a respective permission indicates a respective operation that a receiving device may perform on the object, and wherein a respective rule indicates an operation that the receiving device is required to perform when a specified condition occurs in connection with the object;
attaching the permissions and rules to the object;
generating a unique identifier for a portion of the object;
sending the portion of the object with the unique identifier to a server; and
sending, by the sending device, at least a remaining portion of the object encrypted with a symmetric key and the unique identifier to the receiving device, wherein the symmetric key is encrypted with a public key of the receiving device or a user associated with the receiving device.

2. The method of claim 1, wherein the unique identifier is stored via a distributed lookup table including but not limited to a distributed hash table.

3. The method of claim 1, further comprising:
displaying, in a messaging session involving a plurality of users, responses to each user according to a hierarchical structure so that a response to a message in a message thread is depicted as branching off from the message.

4. The method of claim 1, wherein a rule is one of:
requiring that the receiving device prevent execution of a forwarding operation when receiving a command to forward the message;
requiring that the receiving device prevent execution of a screenshot operation when receiving a command to take a screenshot of the object;

requiring that the receiving device prevent execution of a printing operation when receiving a command to print the object;
requiring that the receiving device prevent execution of a download operation when receiving a command to download the object;
requiring that the receiving device delete an object after taking a screenshot; and
requiring that the receiving device delete an object after the user views the object.

5. The method of claim 1, further comprising:
receiving user input to anonymously send a message and/or other content to an external service;
verifying the identity of the user; and
receiving messages for the user from others and continuing messaging with others using the user's verified identity.

6. The method of claim 1, further comprising:
displaying a plurality of messages in attachment view so that the user may view only the attachments, wherein an attachment includes a generated thumbnail for each file that is smaller than an original size of the file.

7. The method of claim 1, wherein a permission indicates whether the receiving device is allowed to perform one of the following:
forward the message and/or content;
stash the message and/or content;
add a participant to a message header indicating parties that receive the message and associated replies;
remove a participant from the message header indicating parties that receive the message and associated replies;
take a screenshot that includes the message and/or content
select text from the message and/or content;
print the message and/or content; and
download the message and/or content to external storage.

8. The method of claim 1, further comprising receiving user input to specify permissions for others to access and roll back an item in a stash.

9. The method of claim 1, further comprising:
performing optical character recognition on attachments;
receiving user input specifying a search item, and searching through
the attachments and associated metadata for the search item.

10. The method of claim 1, wherein the condition is specified by the user input received at the sending device.

11. The method of claim 1, wherein the operation that the receiving device is required to perform is in response to a specific user action occurring in connection with the object as specified by the respective rule.

12. A method performed by a receiving device to receive an object comprising:
receiving at least a portion of the object encrypted with a symmetric key and a unique identifier at the receiving device, wherein the object is a message or other content, and wherein the symmetric key is encrypted with a public key of the receiving device or a user associated with the receiving device;
requesting an additional portion of the object from a server, wherein the request includes the unique identifier, wherein the unique identifier is generated by the sending device for the additional portion of the object, and the additional portion of the object with the unique identifier is sent to the server by the sending device;
generating the object based on at least the portion of the object and the additional portion of the object;
extracting permissions and rules from the object, wherein the permissions and rules are set at the sending device according to user input received at the sending device, wherein a respective permission indicates a respective operation that the receiving device may perform on the object, and wherein a respective rule indicates an operation that the receiving device is required to perform when a specified condition occurs in connection with the object; and
providing the object to a user.

13. The method of claim 11, further comprising: obtaining an encrypted portion of the object from a server.

14. The method of claim 12, wherein extracting permissions further comprises: decrypting and extracting the symmetric key from the message using a private key of the receiving device; and decrypting the object with the symmetric key.

15. The method of claim 11, further comprising:
receiving user input specifying an operation to be performed on the object;
determining whether the operation is authorized based on the rules and/or permissions of the object; and
responsive to determining that the operation is authorized, performing the operation on the object.

16. A non-transitory computer-readable storage medium storing instructions that when executed by a computer cause the computer to perform a method for sending an object, the method comprising:
receiving the object at a sending device, wherein the object is a message or other content;
receiving user input at the sending device to set permissions and rules for the object, wherein a respective permission indicates a respective operation that a receiving device may perform on the object, and wherein a respective rule indicates an operation that the receiving device is required to perform when a specified condition occurs in connection with the object;
attaching the permissions and rules to the object;
generating a unique identifier for a portion of the object;
sending the portion of the object with the unique identifier to a server; and
sending, by the sending device, at least a remaining portion of the object encrypted with a symmetric key and the unique identifier to the receiving device, wherein the symmetric key is encrypted with a public key of the receiving device or a user associated with the receiving device.

17. The storage medium of claim 15, wherein the method further comprises:
wherein the unique identifier is optionally stored via a distributed lookup table including but not limited to a distributed hash table.

18. The storage medium of claim 15, wherein the method further comprises:
in a messaging session involving a plurality of users displaying responses to each user according to a hierarchical structure so that a response to a message in a message thread is depicted as branching off from the message.

19. The storage medium of claim 15, wherein a rule is one of:
requiring that the receiving device prevent execution of a forwarding operation when receiving a command to forward the message;
requiring that the receiving device prevent execution of a screenshot operation when receiving a command to take a screenshot of the object;

requiring that the receiving device prevent execution of a printing operation when receiving a command to print the object;
requiring that the receiving device prevent execution of a download operation when receiving a command to download the object;
requiring that the receiving device delete an object after taking a screenshot; and
requiring that the receiving device delete an object after the user views the object.

20. The storage medium of claim 15, wherein the method further comprises:
allowing the user to anonymously send a message and/or other content to an external service;
verifying the identity of the user; and
allowing the user to receive messages from others and continue messaging with others using the user's verified identity.

21. The storage medium of claim 15, wherein a permission indicates whether the receiving device is allowed to perform one of the following:
forward the message and/or content;
stash the message and/or content;
add a participant to a message header indicating parties that receive the message and associated replies;
remove a participant from the message header indicating parties that receive the message and associated replies;
take a screenshot that includes the message and/or content select text from the message and/or content;
print the message and/or content; and
download the message and/or content to external storage.

22. A non-transitory computer-readable storage medium storing instructions that when executed by a computer cause the computer to perform a method executed by a receiving device to receive an encrypted object, the method comprising:
receiving at least a portion of the object encrypted with a symmetric key and a unique identifier at the receiving device, wherein the object is a message or other content, and wherein the symmetric key is encrypted with a public key of the receiving device or a user associated with the receiving device;
requesting an additional portion of the object from a server, wherein the request includes the unique identifier, wherein the unique identifier is generated by the sending device for the additional portion of the object, and the additional portion of the object with the unique identifier is sent to the server by the sending device;
generating the object based on at least the portion of the object and the additional portion of the object;
extracting permissions and rules from the object, wherein the permissions and rules are set at the sending device according to user input received at the sending device, wherein a respective permission indicates a respective operation that the receiving device may perform on the object, and wherein a respective rule indicates an operation that the receiving device is required to perform when a specified condition occurs in connection with the object; and
providing the object to a user.

23. The storage medium of claim 21, further comprising: obtaining an encrypted portion of the object from a server.

24. The storage medium of claim 21, wherein the method further comprises:
receiving user input specifying an operation to be performed on the object;
determining whether the operation is authorized based on the rules and/or permissions of the object; and
responsive to determining that the operation is authorized, performing the operation on the object.

25. A system comprising:
a processor;
a memory; and
a non-transitory computer-readable storage medium storing instructions that when executed by a computer cause the computer to perform a method for sending an object, the method comprising:
receiving the object at a sending device, wherein the object is a message or other content;
receiving user input at the sending device to set permissions and rules for the object, wherein a respective permission indicates a respective operation that a receiving device may perform on the object, and wherein a respective rule indicates an operation that the receiving device is required to perform when a specified condition occurs in connection with the object;
attaching the permissions and rules to the object;
generating a unique identifier for a portion of the object;
sending the portion of the object with the unique identifier to a server; and
sending, by the sending device, at least a remaining portion of the object encrypted with a symmetric key and the unique identifier to the receiving device, wherein the symmetric key is encrypted with a public key of the receiving device or a user associated with the receiving device.

26. The system of claim 24, wherein the unique identifier is optionally stored via a distributed lookup table including but not limited to a distributed hash table.

27. The system of claim 24, wherein the method further comprises:
receiving user input to anonymously send a message and/or other content to an external service;
verifying the identity of the user; and
receiving messages for the user from others and continuing messaging with others using the user's verified identity.

28. A system comprising:
a processor;
a memory; and
a non-transitory computer-readable storage medium storing instructions that when executed by a computer cause the computer to perform a method for receiving an object, the method comprising:
receiving at least a portion of the object encrypted with a symmetric key and a unique identifier at a receiving device, wherein the object is a message or other content, and wherein the symmetric key is encrypted with a public key of the receiving device or a user associated with the receiving device;
requesting an additional portion of the object from a server, wherein the request includes the unique identifier, wherein the unique identifier is generated by the sending device for the additional portion of the object, and the additional portion of the object with the unique identifier is sent to the server by the sending device;
generating the object based on at least the portion of the object and the additional portion of the object;
extracting permissions and rules from the object, wherein the permissions and rules are set at the sending device according to user input received at the sending device, wherein a respective permission indicates a respective operation that the receiving device may perform on the object, and wherein a respective rule indicates an operation that the receiving device is required to perform when a specified condition occurs in connection with the object; and providing the object to a user.

29. The system of claim 27, wherein the method further comprises:

receiving user input specifying an operation to be performed on the object;

determining whether the operation is authorized based on the rules and/or permissions of the object; and responsive to determining that the operation is authorized, performing the operation on the object.

30. The system of claim 27, further comprising: obtaining an encrypted portion of the object from a server.

* * * * *

UNITED STATES PATENT AND TRADEMARK OFFICE
CERTIFICATE OF CORRECTION

PATENT NO. : 9,961,030 B2  
APPLICATION NO. : 14/874346  
DATED : May 1, 2018  
INVENTOR(S) : Murphy et al.

Page 1 of 1

It is certified that error appears in the above-identified patent and that said Letters Patent is hereby corrected as shown below:

In the Claims

Column 30, Line 11 (Claim 13, Line 1): change "11" to --12--

Column 30, Line 13 (Claim 14, Line 1): change "12" to --13--

Column 30, Line 18 (Claim 15, Line 1): change "11" to --12--

Column 30, Line 48 (Claim 17, Line 1): change "15" to --16--

Column 30, Line 53 (Claim 18, Line 1): change "15" to --16--

Column 30, Line 60 (Claim 19, Line 1): change "15" to --16--

Column 31, Line 11 (Claim 20, Line 1): change "15" to --16--

Column 31, Line 20 (Claim 21, Line 1): change "15" to --16--

Column 31, Line 62 (Claim 23, Line 1): change "21" to --22--

Column 31, Line 64 (Claim 24, Line 1): change "21" to --22--

Column 32, Line 31 (Claim 26, Line 1): change "24" to --25--

Column 32, Line 34 (Claim 27, Line 1): change "24" to --25--

Column 33, Line 6 (Claim 29, Line 1): change "27" to --28--

Column 33, Line 14 (Claim 30, Line 1): change "27" to --28--

Signed and Sealed this  
Seventeenth Day of August, 2021

Drew Hirshfeld  
*Performing the Functions and Duties of the*  
*Under Secretary of Commerce for Intellectual Property and*  
*Director of the United States Patent and Trademark Office*